(12) United States Patent
Sato

(10) Patent No.: US 12,196,583 B2
(45) Date of Patent: Jan. 14, 2025

(54) ROTATIONAL OPERATION DEVICE AND ELECTRONIC APPARATUS HAVING THE SAME

(71) Applicant: CANON KABUSHIKI KAISHA, Tokyo (JP)

(72) Inventor: Kei Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/422,243

(22) Filed: Jan. 25, 2024

(65) Prior Publication Data

US 2024/0263970 A1 Aug. 8, 2024

(30) Foreign Application Priority Data

Feb. 6, 2023 (JP) ................................. 2023-016372
May 17, 2023 (JP) ................................. 2023-081644

(51) Int. Cl.
*G01D 5/30* (2006.01)
*G03B 17/02* (2021.01)

(52) U.S. Cl.
CPC .............. *G01D 5/30* (2013.01); *G03B 17/02* (2013.01)

(58) Field of Classification Search
CPC ............ G01D 5/28; G01D 5/30; G01D 5/305; G01D 5/32; G01D 5/34; G01D 5/341; G01D 5/342; G01D 5/347; G01D 5/34707; G01D 5/34715; G01D 5/3473; G01D 5/34738; G03D 17/02; H01H 19/00; H01H 19/02; H01H 19/11; H01H 19/20; H01H 19/28; H01H 19/60; H01H 19/62; H01H 19/623; H01H 19/63; H01H 19/635; H01H 19/6355
See application file for complete search history.

(56) References Cited

U.S. PATENT DOCUMENTS

| | | | | |
|---|---|---|---|---|
| 5,287,137 A | * | 2/1994 | Hara | G02B 7/102 355/61 |
| 5,555,776 A | * | 9/1996 | Gazza | F16H 53/00 74/567 |
| 6,015,970 A | * | 1/2000 | Guzik | G01D 5/34784 250/214 SW |
| 7,745,749 B2 | * | 6/2010 | Ito | B60R 11/0264 200/336 |
| 8,110,758 B2 | * | 2/2012 | Lin | H01H 25/008 200/16 R |

(Continued)

FOREIGN PATENT DOCUMENTS

JP 2006-324110 A 11/2006

*Primary Examiner* — John R Lee
(74) *Attorney, Agent, or Firm* — Cowan, Liebowitz & Latman, P.C.

(57) ABSTRACT

A rotational operation device includes a rotary shaft, a cam unit that is formed around the rotary shaft and shifts in a rotary shaft direction parallel to the rotary shaft, a rotational operation member rotatable around the rotary shaft, a cam follower in contact with the cam unit, a drive member movable in the rotary shaft direction in accordance with a rotation of the rotational operation member, and a detector configured to measure a distance to the drive member and detect a rotation position of the rotational operation member based on the distance.

17 Claims, 21 Drawing Sheets

(56) References Cited

U.S. PATENT DOCUMENTS

| | | | | |
|---|---|---|---|---|
| 8,184,277 | B2* | 5/2012 | Bove | G01D 5/28 |
| | | | | 356/138 |
| 8,680,416 | B2* | 3/2014 | Nakajima | H01H 19/63 |
| | | | | 200/564 |
| 8,796,566 | B2* | 8/2014 | Kerner | H01H 25/06 |
| | | | | 200/4 |
| 8,976,047 | B2* | 3/2015 | Degawa | H01H 25/065 |
| | | | | 341/35 |
| 9,251,977 | B2* | 2/2016 | Koiwai | H03K 17/9622 |
| 9,268,356 | B2* | 2/2016 | Burleson | G05G 5/06 |
| 9,728,356 | B2* | 8/2017 | Levay | B60K 35/00 |
| 10,116,308 | B2* | 10/2018 | Ito | H01H 19/11 |
| 11,287,723 | B2* | 3/2022 | Suzuki | H04N 23/50 |
| 2007/0140454 | A1* | 6/2007 | Ito | B60R 11/0264 |
| | | | | 379/159 |
| 2012/0279841 | A1* | 11/2012 | Nakajima | H01H 19/11 |
| | | | | 200/564 |
| 2013/0161175 | A1* | 6/2013 | Koiwai | H03K 17/9622 |
| | | | | 200/5 R |
| 2020/0201140 | A1* | 6/2020 | Suzuki | G05G 5/065 |
| 2024/0137643 | A1* | 4/2024 | Ueda | H04N 23/62 |

* cited by examiner

ROTATIONAL OPERATION DEVICE AND ELECTRONIC APPARATUS HAVING THE SAME

BACKGROUND

Technical Field

One of the aspects of the embodiments relates to a rotational operation device such as an electronic dial, and the like, mounted on an electronic apparatus, for example, a digital camera, a digital video camera, and the like.

Description of Related Art

Conventionally, in a rotational operation device of performing various settings provided in an electronic apparatus, a configuration with high durability and that reduces an erroneous detection of a rotation position of a rotational operation member has been proposed. In Japanese Patent Laid-Open No. 2006-324110, a configuration is proposed in which a rotation movement of a dial is converted to a linear movement by a pinion and a rack, and a position of a linear motion member moving linearly is measured by a linear sensor, whereby a signal in accordance with a rotation position of the dial is output.

However, a switch device of Japanese Patent Laid-Open No. 2006-324110 is increased in size due to a rack mechanism and the linear sensor.

SUMMARY

A rotational operation device according to one aspect of the embodiment includes a rotary shaft, a cam unit that is formed around the rotary shaft and shifts in a rotary shaft direction parallel to the rotary shaft, a rotational operation member rotatable around the rotary shaft, a cam follower in contact with the cam unit, a drive member movable in the rotary shaft direction in accordance with a rotation of the rotational operation member, and a detector configured to measure a distance to the drive member and detect a rotation position of the rotational operation member based on the distance. An electronic apparatus having the above rotational operation device also constitutes another aspect of the embodiment.

Further features of various embodiments of the disclosure will become apparent from the following description of embodiments with reference to the attached drawings.

DESCRIPTION OF THE EMBODIMENTS

Figure 1:
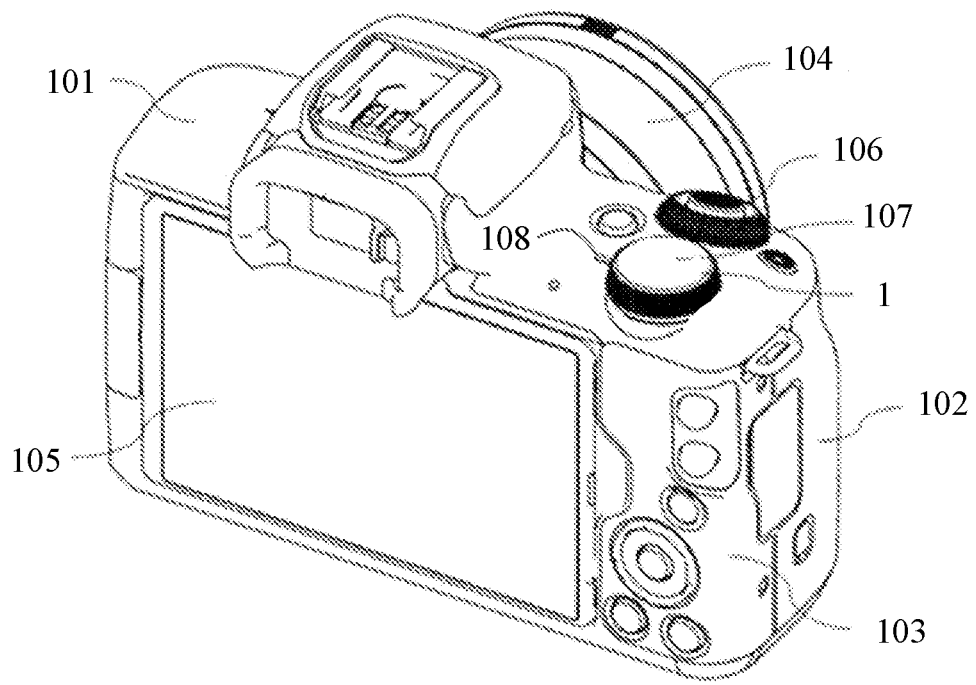
FIG. 1 is a perspective view of a digital camera that is one example of an electronic apparatus according to a first embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 is a perspective view of a digital camera (hereinbelow, referred to as a camera) 100 that is one example of an electronic apparatus according to a present embodiment, viewed from a rear surface side (a user side) and from above. The present disclosure is applicable to other electronic apparatuses such as a video camera, a personal digital assistant, and the like.

Exterior members of the camera 100 are configured by an upper surface cover 101, a front surface cover 102, and a rear surface cover 103. On a front surface side (an object side) of the camera 100, a lens unit 104 is provided. On the rear surface side of the camera 100, a display unit 105 such as an LCD, and the like, is supported rotatably with respect to the camera 100. On an upper surface portion of the camera 100, a rotational operation unit (rotational operation device, electronic dial device) 107 including a shutter button 106, and a dial (rotational operation member) 1 as an operation member is provided. In this embodiment, by rotating the dial 1 clockwise or counterclockwise, an image capturing mode such as a shutter-speed priority mode (Tv mode), an aperture value (F-number) priority mode (Av mode), and the like, can be selected. Inside the camera 100, a receiving unit that receives a signal regarding a selected image capturing mode is provided.

Figure 2:
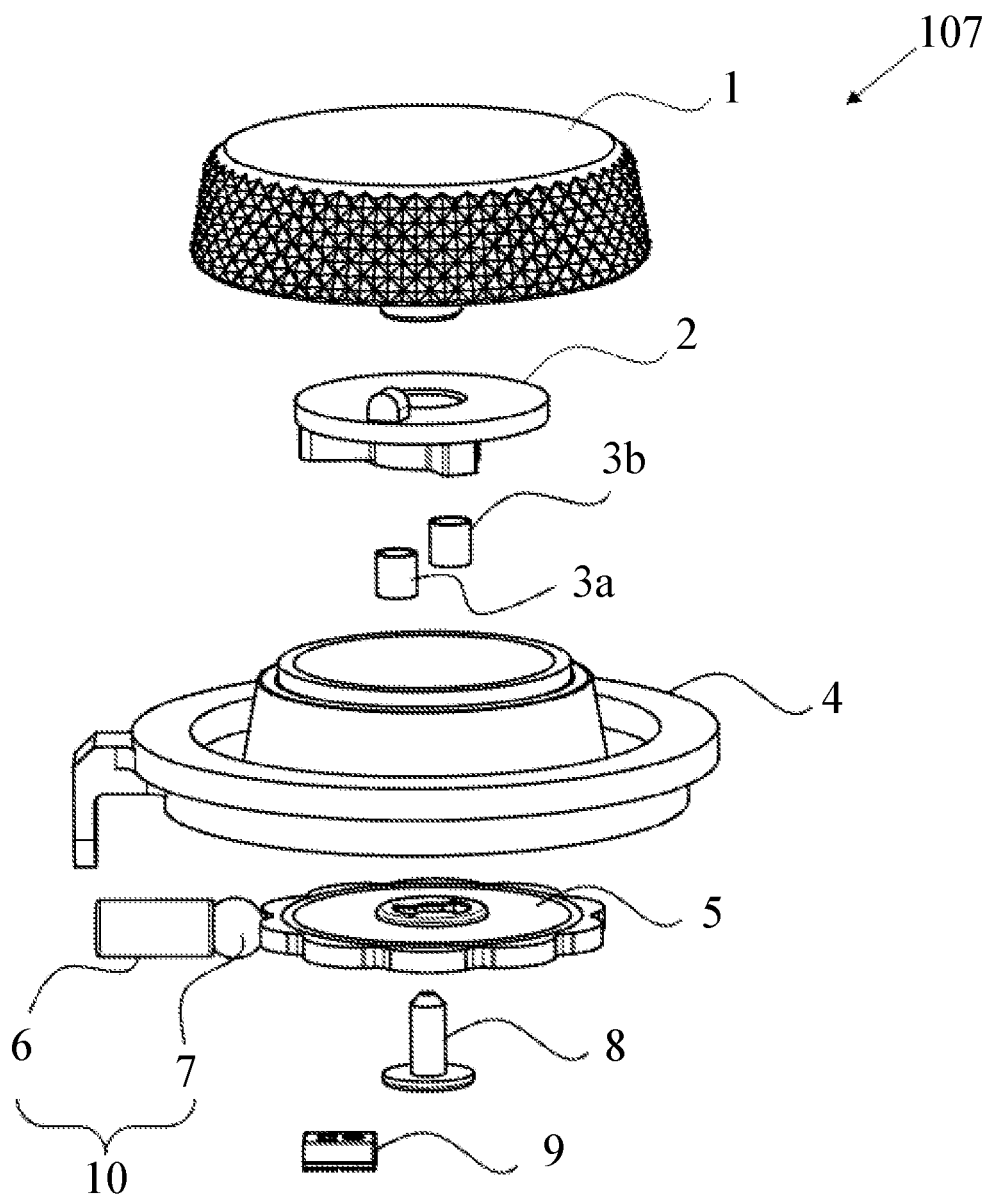
FIG. 2 is an exploded perspective view of a rotational operation unit according to the first embodiment.

FIG. 2 is an exploded perspective view of the rotational operation unit 107. The rotational operation unit 107 includes the dial 1, a driving lever (drive member) 2, urging springs (urging members) 3a, 3b, a base (holding member) 4, a rotary member 5, a fastening member 8, a distance sensor (detector) 9, and a click mechanism 10. The dial 1 is used when a user performs a rotational operation, and is configured so as to be rotatable around a rotary shaft. The driving lever 2 is movable in a direction parallel to a later-described rotary shaft 1b of the dial 1 (rotary shaft direction) in accordance with a rotation of the dial 1. The urging springs 3a, 3b urge the driving lever 2. The base 4 rotatably holds the dial 1. The rotary member 5 is a colorless and transparent member formed by an acrylic material, and the like, fastened to the later-described rotary shaft 1b of the dial 1 by the fastening member 8, and rotates integrally with the dial 1. The click mechanism 10 includes a compression spring 6 and a click ball (ball member) 7, and generates clicking operation force (click force) in accordance with the rotation of the dial 1.

Hereinbelow, each component that configures the rotational operation unit 107 is described.

Figure 3A:
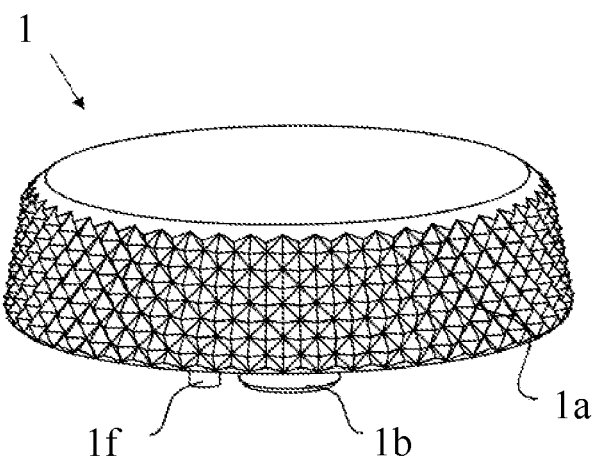
FIGS. 3A, 3B, 3C, and 3D are explanatory diagrams of a dial according to the first embodiment.
Figure 3B:
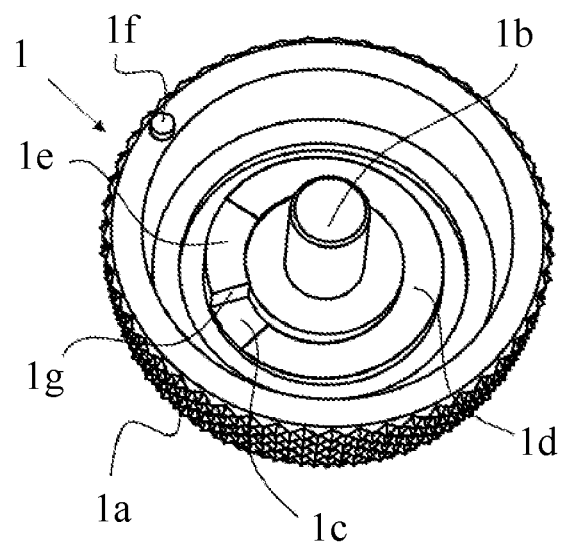
Figure 3C:
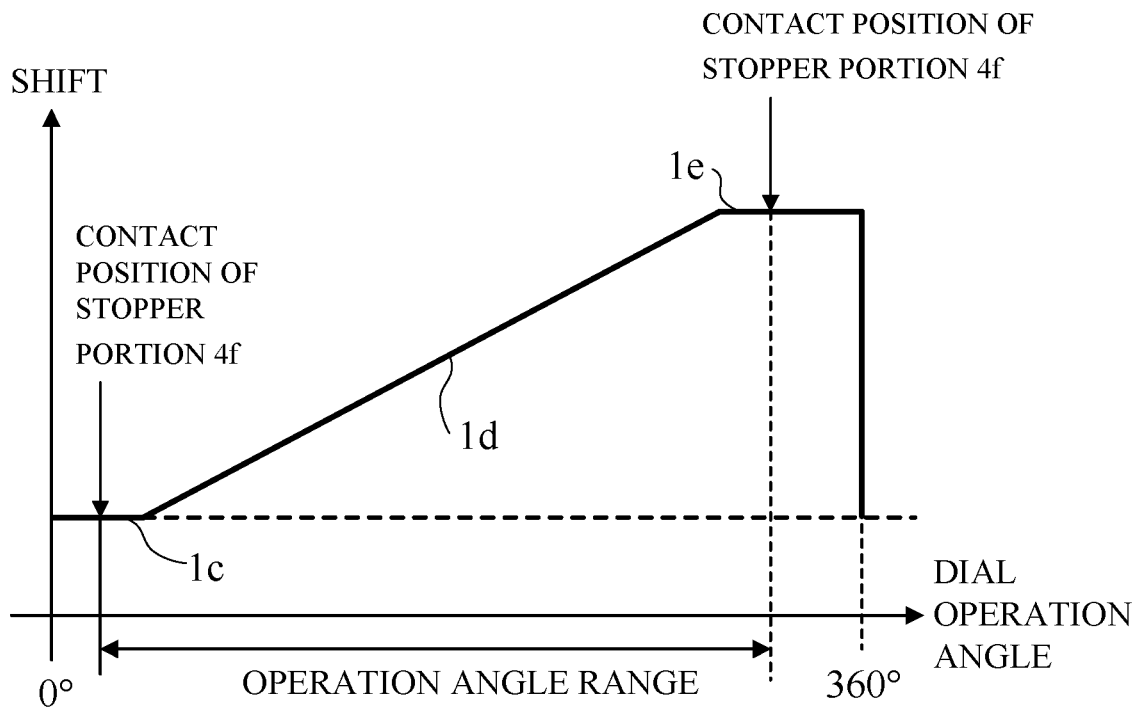
Figure 3D:
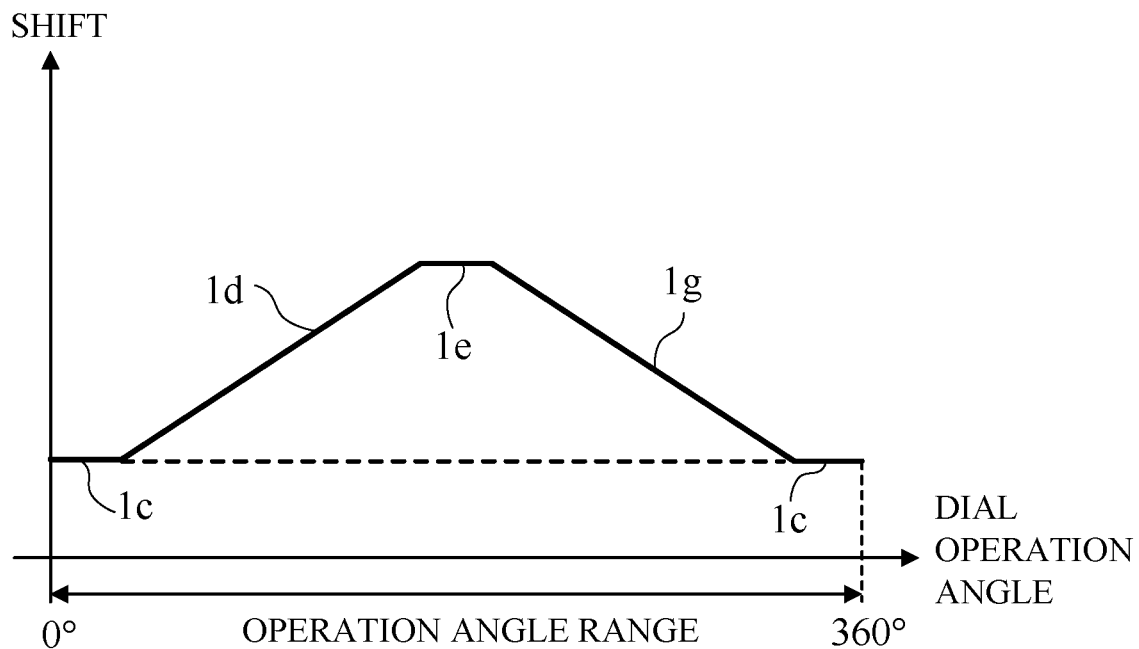

FIGS. 3A and 3B are an upper surface perspective view and a lower surface perspective view, respectively, of the dial 1. FIG. 3C is an expanded view of a cam unit in a case where the dial 1 is viewed from a lower surface. FIG. 3D is an expanded view of a cam unit having a different shape from the cam unit of FIG. 3C. In FIGS. 3C and 3D, a horizontal axis illustrates an operation angle of the dial 1, and a vertical axis illustrates a shift in the rotary shaft direction.

The dial 1 includes an operation unit 1a, the rotary shaft 1b and the cam unit. The operation unit 1a is used when being operated by the user. The cam unit is formed around the rotary shaft 1b, and shifts in the rotary shaft direction. The cam unit includes a first surface provided at a first position in the rotary shaft direction, a second surface provided at a second position different from the first position in the rotary shaft direction, and a connection surface that continuously connects the first surface with the second surface. In this embodiment, as illustrated in FIG. 3C, the cam unit includes a cam bottom 1c that is a bottom surface, a cam top 1e having a predetermined level difference with respect to the cam bottom 1c, and a tilt surface 1d that continuously connects the cam bottom 1c with the cam top 1e. One of the cam bottom 1c and the cam top 1e is the first surface, and the other one of the cam bottom 1c and the cam top 1e is the second surface. The tilt surface 1d is the connection surface. The cam unit includes a protruding portion 1f that comes in contact with a later-described stopper portion 4f of the base 4 and regulates the dial 1 from rotating by one revolution.

As illustrated in FIG. 3D, the cam unit may include two tilt surfaces 1d, 1g that continuously connect the cam bottom 1c with the cam top 1e within one round. When the cam unit illustrated in FIG. 3C is used, the dial 1 cannot be rotated by one revolution, however, when the cam unit illustrated in FIG. 3D is used, the dial 1 can be rotated by one revolution. In a case where the cam unit illustrated in FIG. 3D is used, it is not necessary for the stopper portion 4f and the protruding portion 1f to be provided.

Figure 4A:
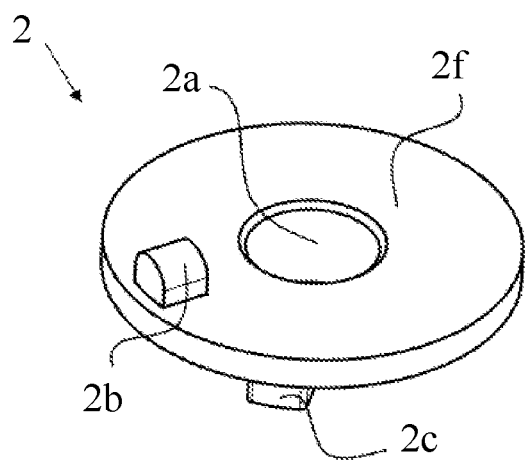
FIGS. 4A and 4B are explanatory diagrams of a driving lever.
Figure 4B:
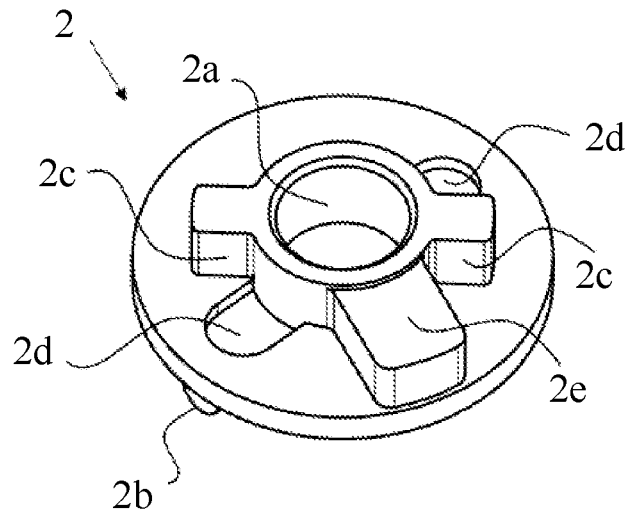

FIGS. 4A and 4B are an upper surface perspective view and a lower surface perspective view, respectively, of the driving lever 2. The driving lever 2 includes a supporting hole 2a, a cam follower 2b, a protruding portion 2c, a spring receiving portion 2d, a reflective portion 2e, and a circular disk portion 2f. The cam follower 2b is disposed on an upper surface of the circular disk portion 2f. The protruding portion 2c, the spring receiving portion 2d, and the reflective portion 2e are disposed on a lower surface of the circular disk portion 2f. The reflective portion 2e reflects light from the distance sensor 9.

Figure 5A:
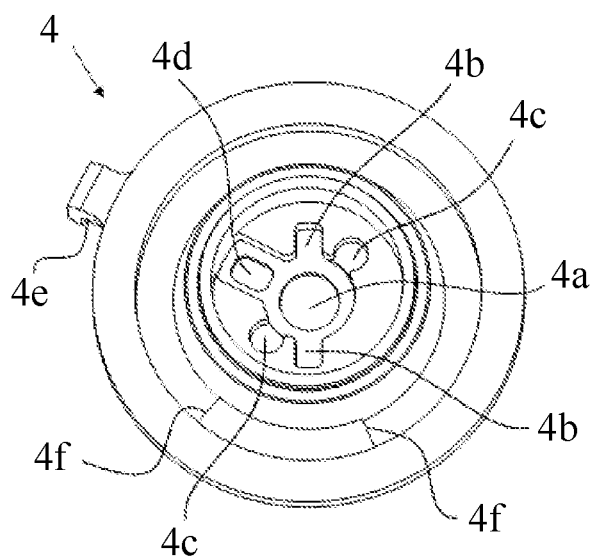
FIGS. 5A and 5B are explanatory diagrams of a base according to the first embodiment.
Figure 5B:
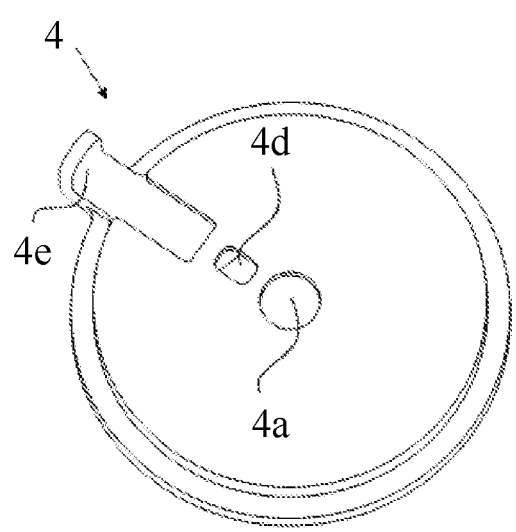

FIGS. 5A and 5B are an upper surface perspective view and a lower surface perspective view, respectively, of the base 4. The base 4 includes a supporting hole 4a, a groove portion 4b, a spring receiving portion 4c, a slit portion 4d, a spring receiving portion 4e, and the stopper portion 4f. The slit portion 4d transmits light ray from the distance sensor 9. The stopper portion 4f comes in contact with the protruding portion 1f and regulates the dial 1 from rotating by one revolution.

Figure 6A:
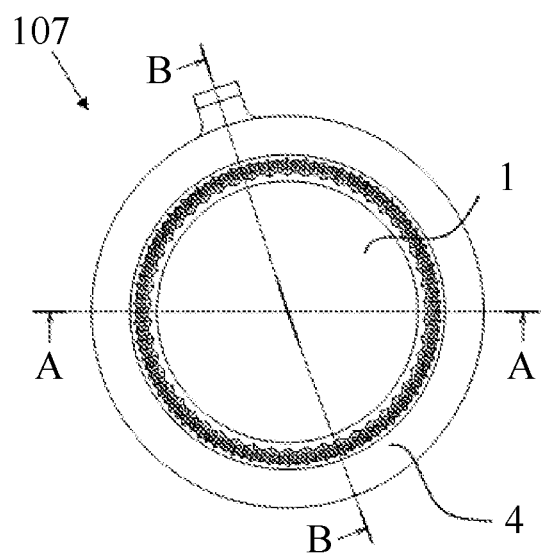
FIGS. 6A, 6B and 6C are explanatory diagrams of the rotational operation unit according to the first embodiment.
Figure 6B:
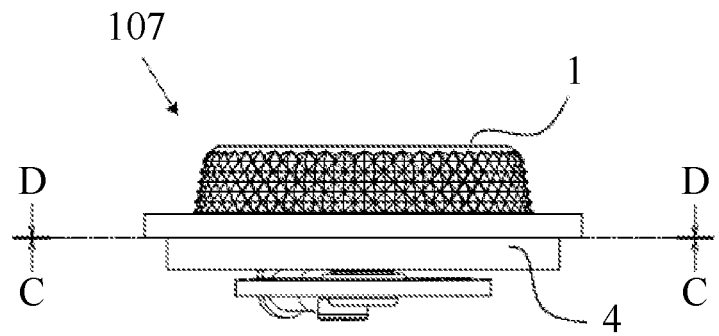
Figure 6C:
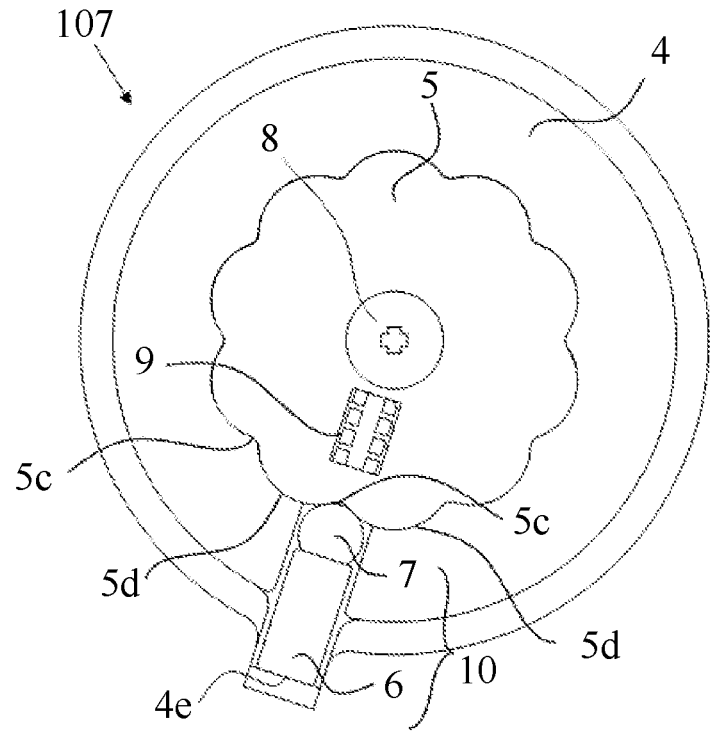
Figure 7A:
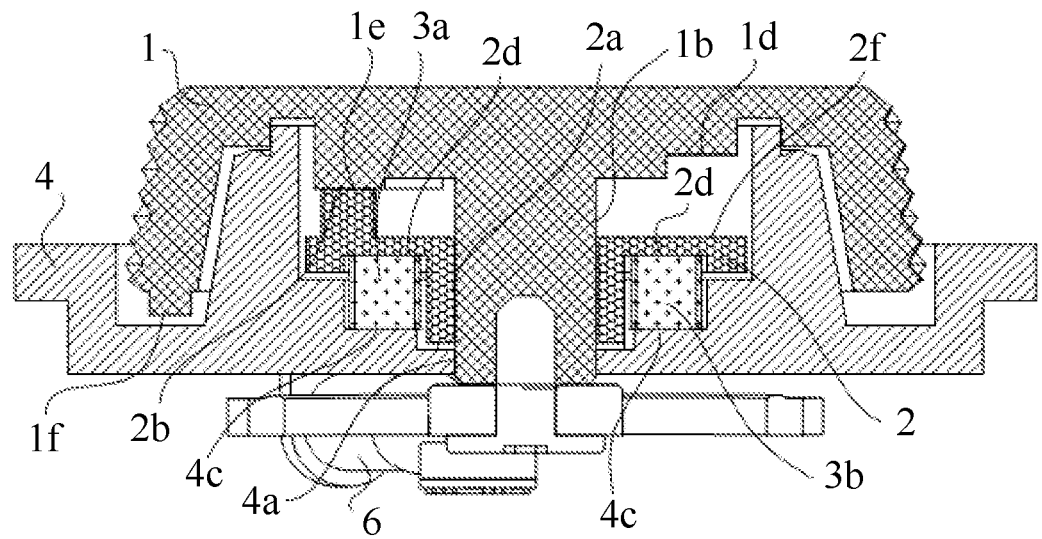
FIGS. 7A and 7B are sectional views of the rotational operation unit according to the first embodiment.
Figure 7B:
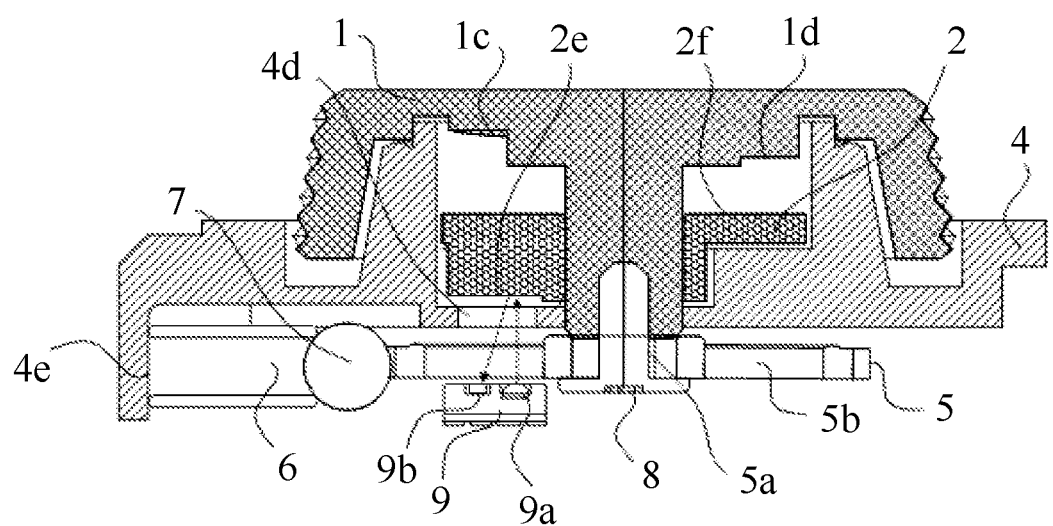
Figure 8A:
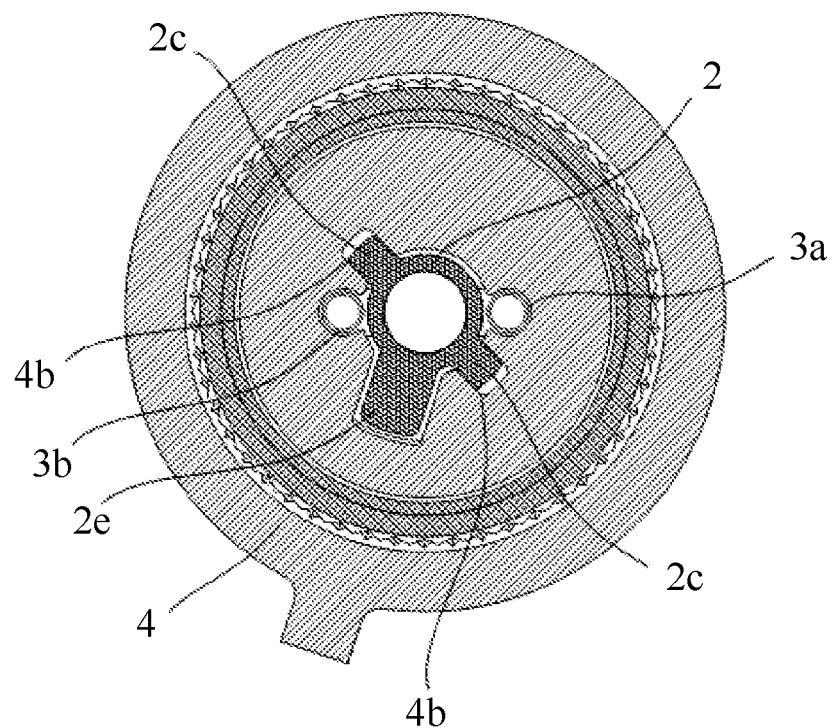
FIGS. 8A and 8B are sectional views of the rotational operation unit according to the first embodiment.
Figure 8B:
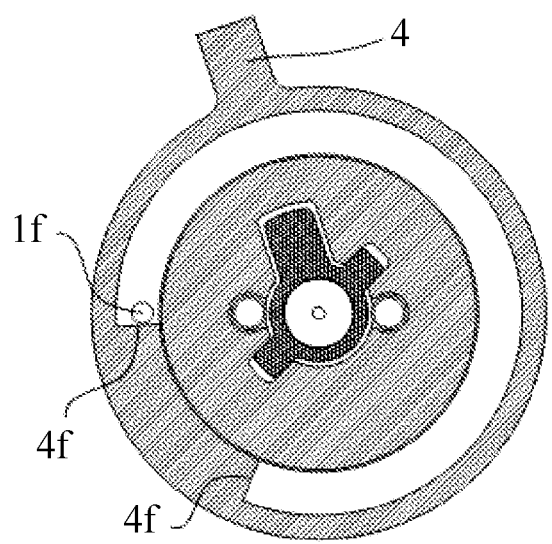

Hereinbelow, an internal configuration of the rotational operation unit 107 is described. FIGS. 6A to 6C are an upper surface view, a side surface view, and a lower surface view, respectively, of the rotational operation unit 107. FIGS. 7A and 7B are sectional views along an A-A line and a B-B line, respectively, of FIG. 6A. FIGS. 8A and 8B are sectional views along a C-C line and a D-D line, respectively, of FIG. 6B.

As illustrated in FIG. 7A, the rotary shaft 1b is engaged with the supporting hole 4a, and the dial 1 is rotatably held by the base 4. As illustrated in FIG. 8A, the protruding portion 2c is fitted into the groove portion 4b, and a movement of the driving lever 2 in a rotation direction is regulated. As illustrated in FIG. 7A, the supporting hole 2a supports the rotary shaft 1b, and the driving lever 2 can move only in the rotary shaft direction with respect to the dial 1 and the base 4.

As illustrated in FIG. 7A, the urging springs 3a, 3b are compression springs, and are locked between the spring receiving portions 2d, 4c. The cam follower 2b is urged by the urging springs 3a, 3b so as to be constantly in contact with the cam unit of the dial 1. In FIG. 7A, the cam follower 2b is in contact with the cam top 1e. The dial 1 rotates, and a position in the rotary shaft direction of a contact surface of the cam unit that comes in contact with the cam follower 2b changes, whereby the driving lever 2 moves in the rotary shaft direction along the cam unit. According to such a configuration, it is possible to reduce a length in a radial direction of the dial 1 while simplifying the configuration.

As illustrated in FIG. 7A, one of the spring receiving portions 2d and the urging spring 3a are disposed on a roughly lower side of the cam follower 2b. In other words, the urging spring 3a is disposed so that at least a portion thereof overlaps the cam follower 2b when viewed from the rotary shaft direction. The other spring receiving portion 2d and the urging spring 3b are disposed at positions being roughly opposed to the one spring receiving portion 2d and the urging spring 3a, respectively, with respect to the rotary shaft 1b. When the urging spring 3a is disposed on the roughly lower side of the cam follower 2b, force that the cam follower 2b receives from the cam unit of the dial 1 can be counteracted by urging force of the urging spring 3a, whereby it is possible to suppress the driving lever 2 from tilting. Accordingly, it is possible to reduce a fitting length of the supporting hole 2a with respect to the rotary shaft 1b.

By providing the two urging springs 3a, 3b, since the urging force toward the driving lever 2 is twice as much in comparison to a configuration where a single urging spring is provided, spring force of each of the urging springs can be weakened. As a result, the urging springs 3a, 3b can be reduced in size, and a spring arrangement space in the rotary shaft direction and the radial direction can be reduced. An effect of the present disclosure can be obtained even in a case where a configuration of arranging only the urging spring 3a disposed on the roughly lower side of the cam follower 2b is adopted.

Hereinbelow, referring to FIGS. 6C, 7A, and 7B, the rotary member 5 and the click mechanism 10 are described.

The rotary member 5 is disposed on a lower side of the base 4, and rotates integrally with the dial 1, as described above. As illustrated in FIG. 6C, in an outer diameter of the rotary member 5, an undulating projection-and-depression portion where a valley portion 5c with a small radius and a mountain portion 5d with a large radius are alternately present at regular intervals is formed. As illustrated in FIG. 6C, the compression spring 6 is locked by the spring receiving portion 4e, and the click ball 7 is constantly urged toward the undulating projection-and-depression portion in a rotation center direction (direction of the rotary shaft 1b) by the compression spring 6. According to such a configuration, the dial 1 is stopped at a position where the click ball 7 is fitted into the valley portion 5c.

When the user performs a rotational operation of the operation unit 1a by one position, the click ball 7 climbs over the mountain portion 5d and is fitted into the adjacent valley portion 5c. At this time, the operation force is generated in the dial 1, and the user can receive a click feeling of one click. By receiving the click feeling, the user can perform the rotational operation of the dial 1 accurately for the number of clicks as intended.

The click force by the compression spring 6 is set so as to be sufficiently strong in comparison to frictional force between the cam unit of the dial 1 and the cam follower 2b generated by the urging force of the urging spring(s) 3. Accordingly, an influence of the urging force of the urging spring(s) 3 to rotational operation force of the dial 1 can be ignored, whereby the rotational operation force can be roughly constant.

Hereinbelow, referring to FIGS. 6C and 7B, a configuration of the distance sensor 9 is described. In FIGS. 6C and 7B, the dial 1 is stopped at the position where the click ball 7 is fitted into the valley portion 5c. The distance sensor 9 includes a light emitting unit 9a and a light-receiving unit 9b, and is disposed on a lower side of the rotary member 5. The rotary member 5 is a colorless and transparent member and is capable of transmitting light emitted from the light emitting unit 9a. The slit portion 4d and the reflective portion 2e are disposed right above the distance sensor 9. The slit portion 4d has a size enough not to hide the light emitting unit 9a and the light-receiving unit 9b.

Hereinbelow, referring to FIG. 7B, a detection method of a position (rotation position) of the dial 1 in the rotation direction is described. First, the light from the light emitting unit 9a is transmitted through the rotary member 5 and the slit portion 4d, and is reflected by the reflective portion 2e. Next, the light reflected by the reflective portion 2e passes through the slit portion 4d and the rotary member 5, and reaches the light-receiving unit 9b. Next, the light-receiving unit 9b reads an intensity of the reflected light that has reached the light-receiving unit 9b, and measures a distance between the distance sensor 9 and the reflective portion 2e. Finally, the distance sensor 9 detects the rotation position of the dial 1 in accordance with the distance between the distance sensor 9 and the reflective portion 2e. In this embodiment, it is assumed that the distance sensor 9 is a photo-reflector, however, the present disclosure is not limited thereto as long as it is a sensor capable of measuring a distance to an object.

In this embodiment, since the rotation of the dial 1 is converted into a shift of the driving lever 2 in the rotary shaft direction, even in a case where the number of modes is increased, a size of the driving lever 2 in the radial direction need not be enlarged. Accordingly, the configuration of this embodiment is effective in reducing in size the rotational operation unit 107 in the radial direction. Even in a case where the dial 1 with a small diameter is used, it is possible to easily increase the number of modes.

In this embodiment, a space-saving configuration of the cam and the cam follower is adopted, and the small-sized distance sensor 9 is used. Accordingly, the rotational operation unit 107 can be further reduced in size in comparison to a configuration where a rotation of a dial is converted into a linear motion by actions of a pinion and a rack, and a rotation position of the dial is detected by a linear sensor, and the like.

Since an output of the distance sensor 9 is continuous, it is possible to change a design of the number of image capturing modes only by changing the numbers of the valley portions 5c and the mountain portions 5d, and the number of image capturing modes can be designed to be both an even number and an odd number.

Figure 9A:
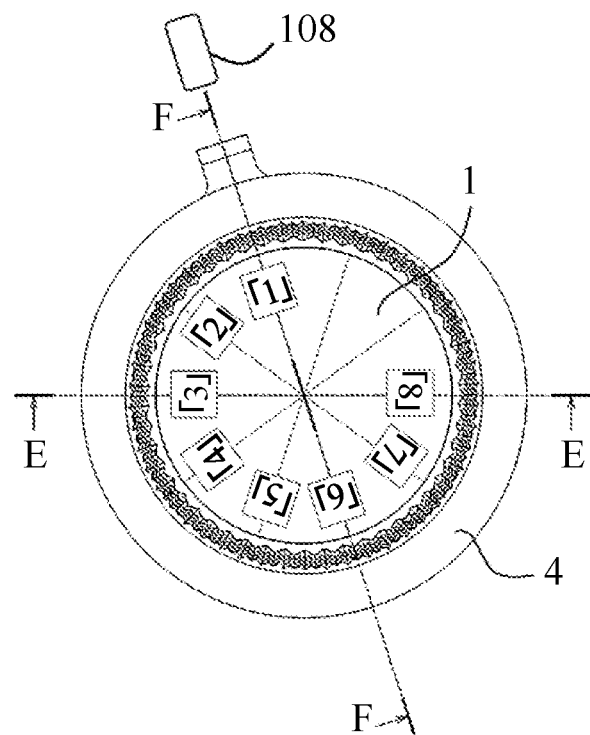
FIGS. 9A, 9B, 9C and 9D are explanatory diagrams of an image capturing mode setting.

Hereinbelow, referring to FIGS. 9A and 9B, an image capturing mode setting is described. FIG. 9A is an upper surface view of the dial 1. The user performs the rotational operation of the operation unit 1a, and matches eight types of image capturing modes ("1", "2", "3", "4", "5", "6", "7", and "8") displayed on an upper surface of the dial 1 with an index 108 provided in the upper surface cover 101, whereby the image capturing modes can be freely switched. For example, by the user performing the rotational operation of the operation unit 1a clockwise, a state of the rotational operation unit 107 can be switched to all states from a state where the image capturing mode is set to "1" to a state where image capturing mode is set to "8". In the same manner, by the user performing the rotational operation of the operation unit 1a counterclockwise, the state of the rotational operation unit 107 can be switched to all states from the state where the image capturing mode is set to "8" to the state where image capturing mode is set to "1".

In FIG. 9A, the image capturing mode is set to "1". The state where the image capturing mode is set to "1" (the state of FIG. 9A) is in the same as the states of FIGS. 7A, 7B, 8A, and 8B. As illustrated in FIG. 7A, the cam follower 2b is in contact with the cam top 1e of the dial 1, and the driving lever 2 is located on a lower end. At this time, as illustrated in FIG. 8B, the protruding portion 1f is in contact with the stopper portion 4f, and the dial 1 is regulated so as not to rotate counterclockwise.

When the user performs the rotational operation of the operation unit 1a clockwise by one position from the state of FIG. 9A, the image capturing mode changes to a state of being set to "2". FIG. 9B is a sectional view along an E-E line of FIG. 9A in a state where the image capturing mode is set to "2". FIG. 9C is a sectional view along an F-F line of FIG. 9A in the state where the image capturing mode is set to "2". When the user performs the rotational operation of the operation unit 1a, the cam unit of the dial 1 also rotates, and the cam follower 2b come in contact with the tilt surface 1d. Accordingly, the driving lever 2 moves to an upper side of the rotary shaft direction, and the distance between the distance sensor 9 and the reflective portion 2e changes. The distance sensor 9 measures the distance to the reflective portion 2e that has shifted in the rotary shaft direction by the rotation of the dial 1, and determines that the state of the rotational operation unit 107 is in the state where the image capturing mode is set to "2".

Figure 9B:
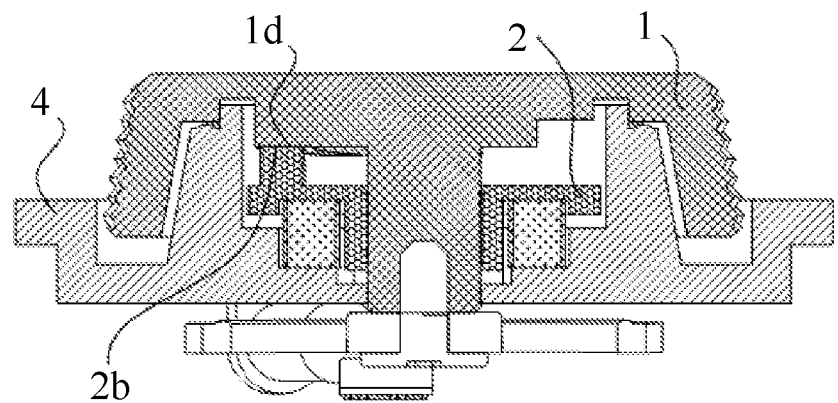
Figure 9C:
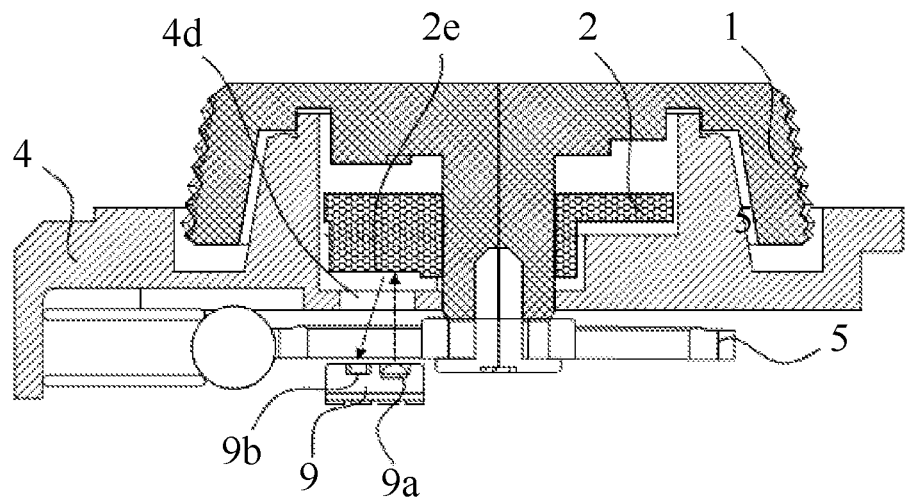
Figure 9D:
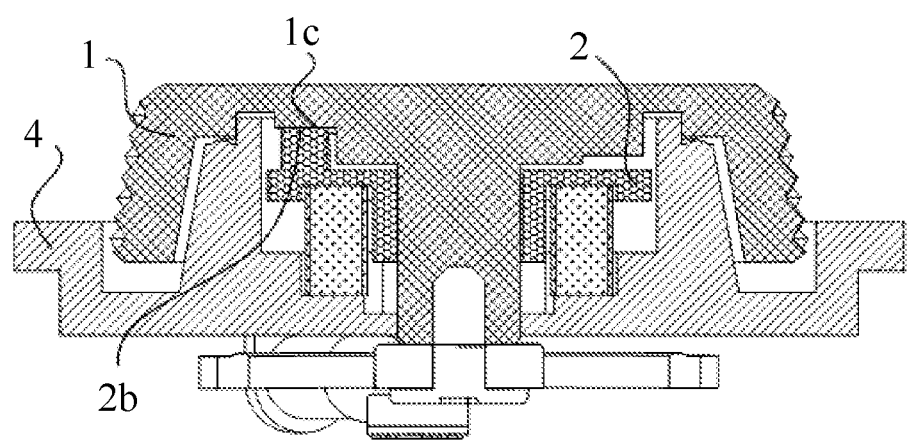

When the user continues performing the rotational operation of the operation unit 1a clockwise from the state of FIGS. 9B and 9C, the image capturing mode changes to a state of being set to "8". FIG. 9D is a sectional view along the E-E line of FIG. 9A in a state where the image capturing mode is set to "8". In the state of FIG. 9D, the cam follower 2b is in contact with the cam bottom 1c, and a position of the driving lever 2 is located on an upper end. At this time, the protruding portion 1f is in contact with the stopper portion 4f, and the dial 1 is regulated so as not to rotate clockwise.

As described above, according to the configuration of this embodiment, since the rotation position of the dial 1 is detected by the non-contact type distance sensor 9, durability can be improved in comparison to a case for example of a configuration where the rotation position of the dial 1 is detected by using phase contact pieces and a conductive pattern. An erroneous detection caused by scraping, and the like, and occurrence of short-circuit, and the like, can be suppressed.

Second Embodiment

In this embodiment, a configuration of the rotational operation unit is different from that of the first embodiment. Corresponding members will be designated by the same reference numerals as the first embodiment, and a duplicate description thereof will be omitted.

Figure 10:
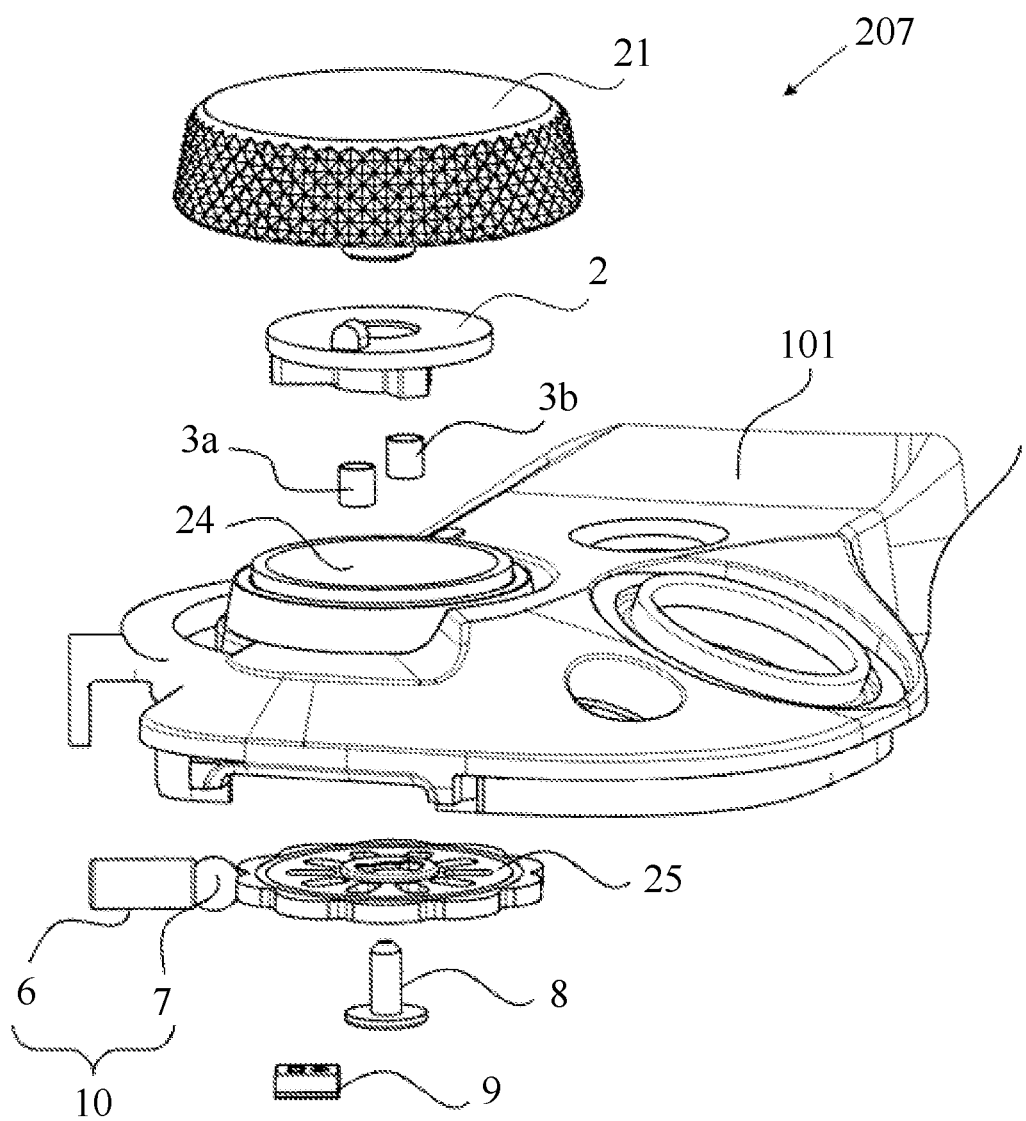
FIG. 10 is an exploded perspective view of the rotational operation unit according to a second embodiment.

FIG. 10 is an exploded perspective view of a rotational operation unit (rotational operation device, electronic dial device) 207 according to a present embodiment. The rotational operation unit 207 includes a dial 21, the driving lever 2, the urging springs 3a, 3b, a base (holding member) 24, a rotary member 25, the fastening member 8, the distance sensor 9, and the click mechanism 10. The dial 21 is used when a user performs a rotational operation, and is configured so as to be rotatable around a rotary shaft. The driving lever 2 is movable in a direction parallel to a later-described rotary shaft 21b of the dial 21 (rotary shaft direction) in accordance with a rotation of the dial 21. The urging springs 3a, 3b urge the driving lever 2. The base 24 rotatably holds the dial 21. The rotary member 25 is fastened to the later-described rotary shaft 1b of the dial 21 by the fastening member 8, and rotates integrally with the dial 21. The click mechanism 10 includes the compression spring 6 and the click ball (ball member) 7, and generates the clicking operation force (click force) in accordance with the rotation of the dial 21.

Hereinbelow, each component that configures the rotational operation unit 207 is described.

Figure 11A:
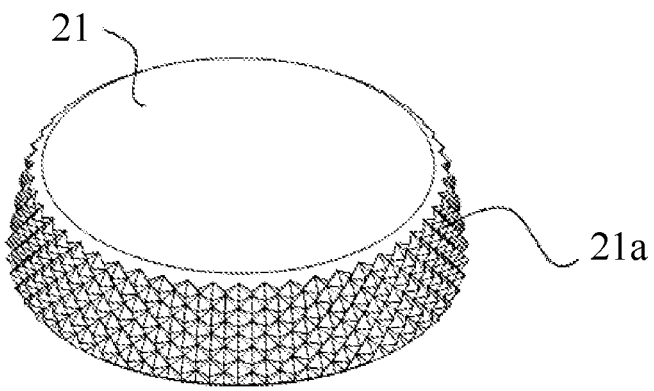
FIGS. 11A, 11B and 11C are explanatory diagrams of the dial according to the second embodiment.
Figure 11B:
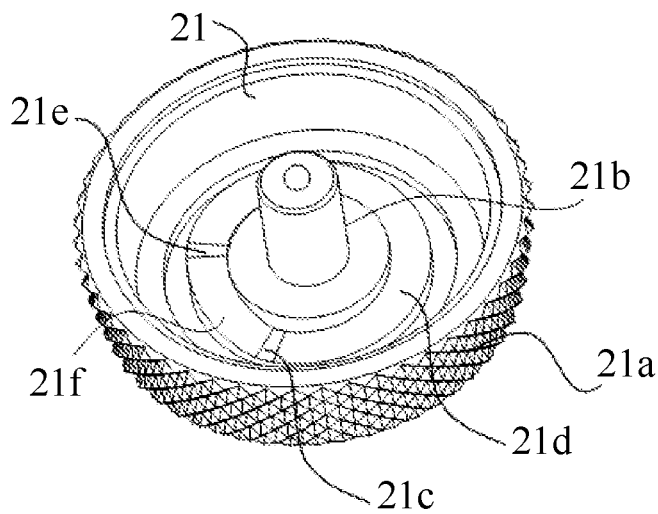
Figure 11C:
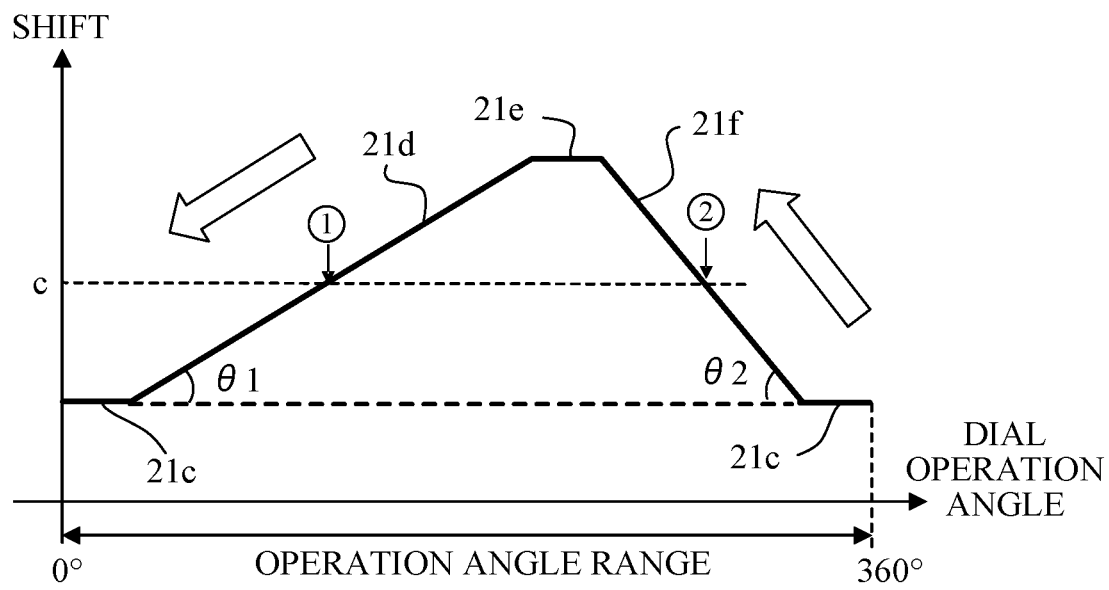

FIGS. 11A and 11B are an upper surface perspective view and a lower surface perspective view, respectively, of the dial 21. FIG. 11C illustrates one example of an expanded view of a cam unit in a case where the dial 21 is viewed from a lower surface. In FIG. 11C, a horizontal axis illustrates an operation angle of the dial 21, and a vertical axis illustrates a shift in the rotary shaft direction.

The dial 1 includes an operation unit 21a, the rotary shaft 21b and the cam unit. The operation unit 21a is used when being operated by the user. The cam unit is formed around the rotary shaft 21b, and shifts in the rotary shaft direction. The cam unit includes a first surface provided at a first position in the rotary shaft direction, a second surface provided at a second position different from the first position in the rotary shaft direction, and a connection surface that continuously connects the first surface with the second surface. In this embodiment, as illustrated in FIG. 11C, the cam unit includes a cam bottom 21c that is a bottom surface, and a cam top 21e having a predetermined level difference with respect to the cam bottom 21c. The cam unit further includes a first tilt surface 21d that continuously connects the cam bottom 21c with the cam top 21e, and a second tilt surface 21f that continuously connects the cam top 21e with the cam bottom 21c. One of the cam bottom 21c and the cam top 21e is the first surface, and the other one of the cam bottom 21c and the cam top 21e is the second surface. The first tilt surface 21d and the second tilt surface 21f are the connection surfaces. Accordingly, the cam unit of the dial 21 is a reciprocating cam that starts from the cam bottom 21c via the cam top 21e and returns to the cam bottom 21c in one revolution. As illustrated in FIG. 11C, a value of a tilt angle $\theta 1$ of the first tilt surface 21d is different from a value of a tilt angle $\theta 2$ of the second tilt surface 21f.

Figure 12A:
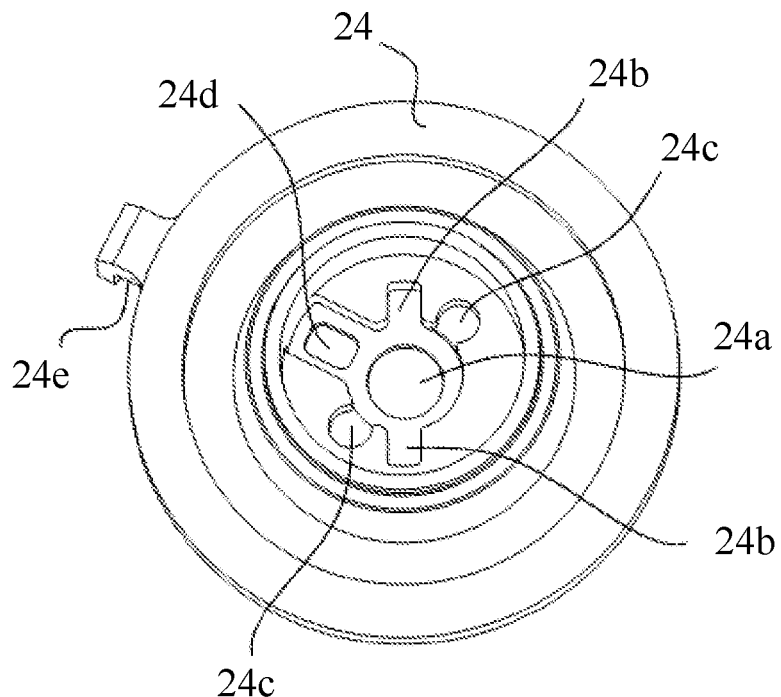
FIGS. 12A and 12B are explanatory diagrams of the base according to the second embodiment.
Figure 12B:
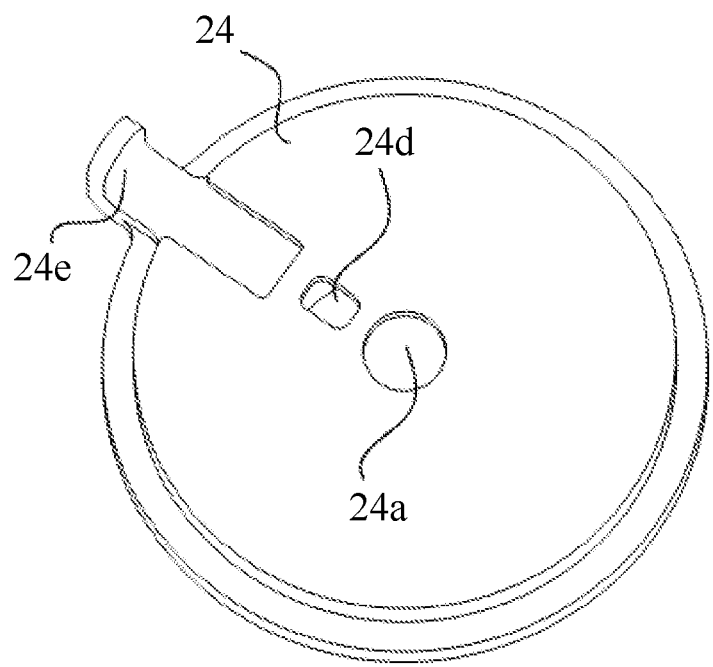

FIGS. 12A and 12B are an upper surface perspective view and a lower surface perspective view, respectively, of the base 24. The base 24 includes a supporting hole 24a, a groove portion 24b, a spring receiving portion 24c, a slit portion 24d, and a spring receiving portion 24e. The slit portion 24d transmits light ray from the distance sensor 9.

Figure 13A:
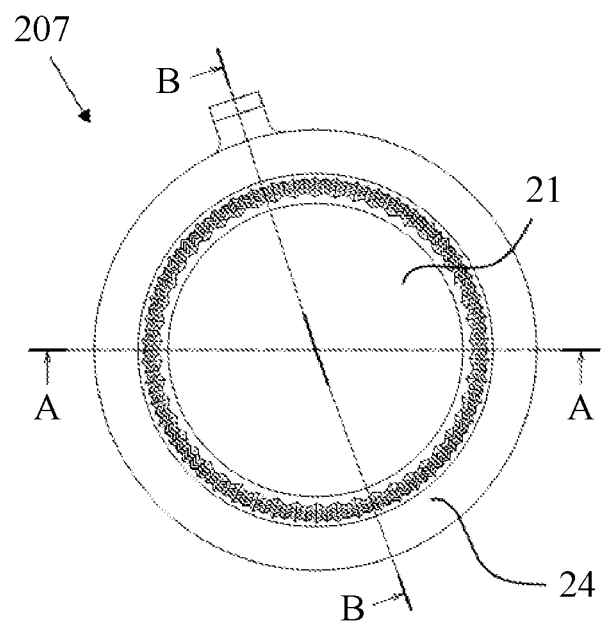
FIGS. 13A, 13B and 13C are explanatory diagrams of the rotational operation unit according to the second embodiment.
Figure 13B:
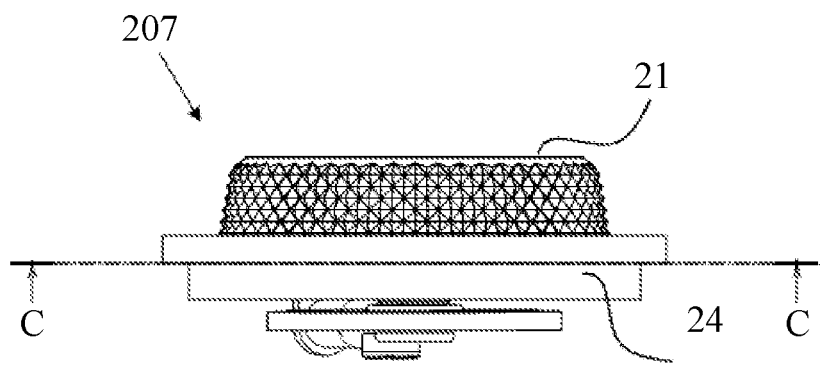
Figure 13C:
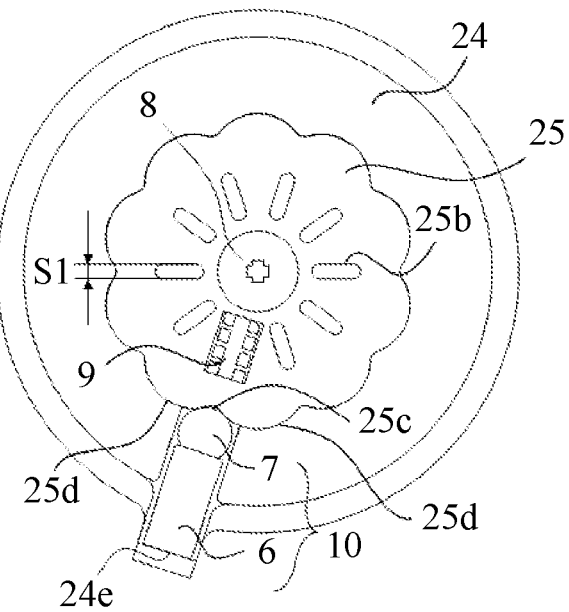
Figure 14A:
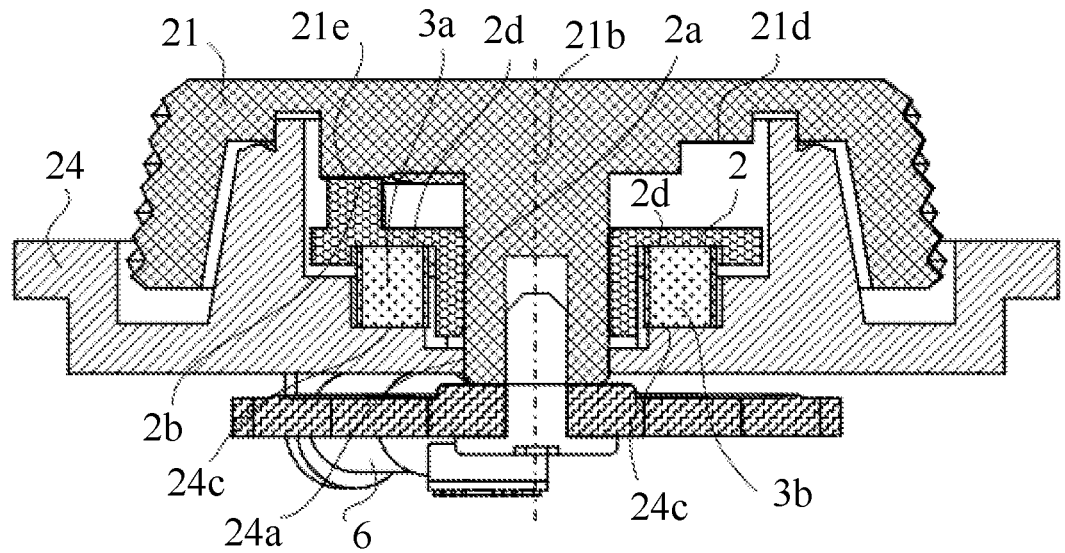
FIGS. 14A and 14B are sectional views of the rotational operation unit according to the second embodiment.
Figure 14B:
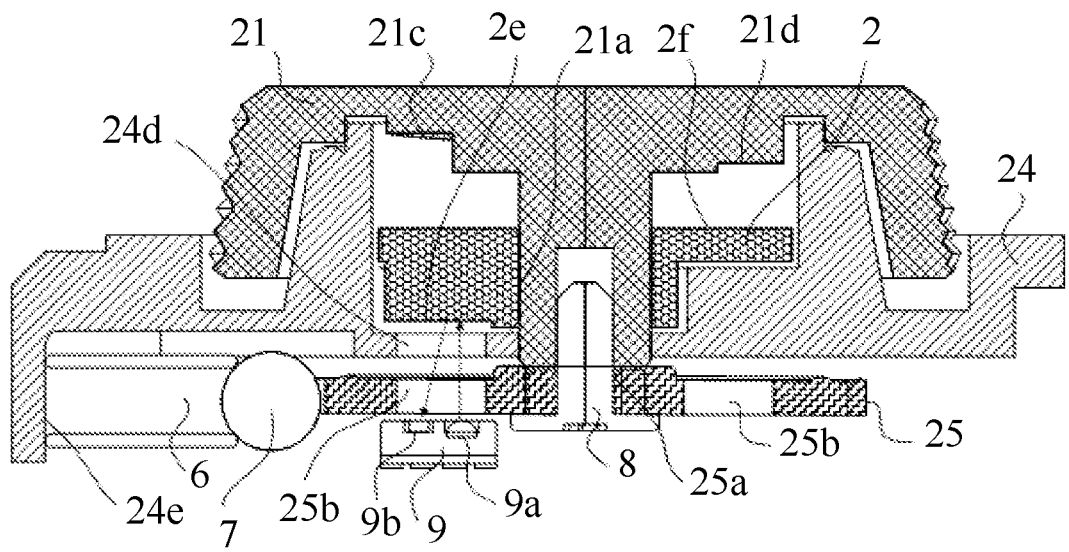
Figure 15:
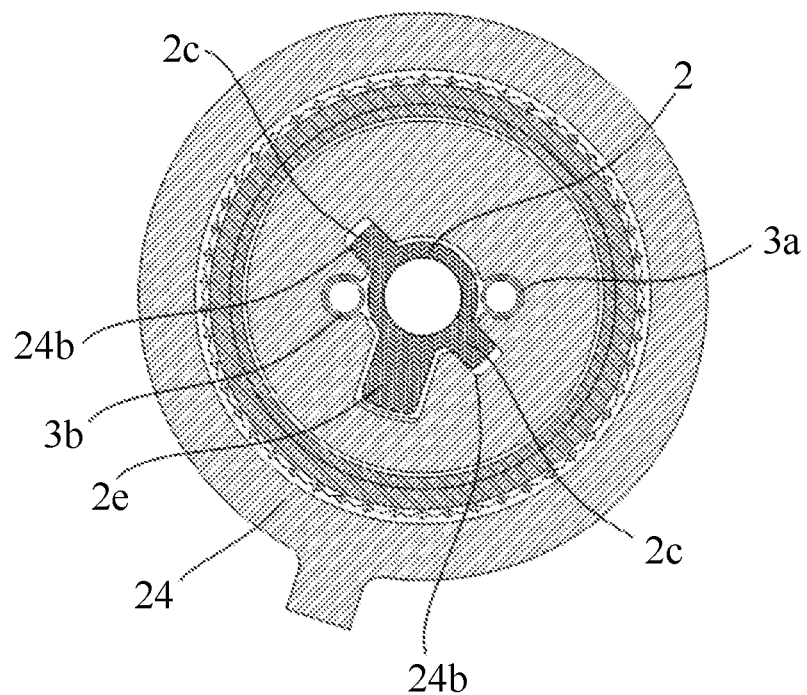
FIG. 15 is a sectional view of the rotational operation unit according to the second embodiment.

Hereinbelow, an internal configuration of the rotational operation unit 207 is described. FIGS. 13A to 13C are an upper surface view, a side surface view, and a lower surface view, respectively, of the rotational operation unit 207. FIGS. 14A and 14B are sectional views along an A-A line and a B-B line, respectively, of FIG. 13A. FIG. 15 is a sectional view along a C-C line of FIG. 13B.

As illustrated in FIG. 14A, the rotary shaft 21b is engaged with the supporting hole 24a, and the dial 21 is rotatably held by the base 24. As illustrated in FIG. 15, the protruding portion 2c is fitted into the groove portion 24b, and a movement of the driving lever 2 in the rotation direction is regulated. As illustrated in FIG. 14A, the supporting hole 2a supports the rotary shaft 21b, and the driving lever 2 can move only in the rotary shaft direction with respect to the dial 21 and the base 24.

As illustrated in FIG. 14A, the urging springs 3a, 3b are compression springs, and are locked between the spring receiving portions 2d, 24c. The cam follower 2b is urged by the urging springs 3a, 3b so as to be constantly in contact with the cam unit of the dial 21. In FIG. 14A, the cam follower 2b is in contact with the cam top 21e. The dial 21 rotates, and a position in the rotary shaft direction of a contact surface of the cam unit that comes in contact with the cam follower 2b changes, whereby the driving lever 2 moves in the rotary shaft direction along the cam unit. According to such a configuration, it is possible to reduce a length in a radial direction of the dial 21 while simplifying the configuration.

As illustrated in FIG. 14A, one of the spring receiving portions 2d and the urging spring 3a are disposed on a roughly lower side of the cam follower 2b. In other words, the urging spring 3a is disposed so that at least a portion thereof overlaps the cam follower 2b when viewed from the rotary shaft direction. The other spring receiving portion 2d and the urging spring 3b are disposed at positions being roughly opposed to the one spring receiving portion 2d and the urging spring 3a, respectively, with respect to the rotary shaft 21b. When the urging spring 3a is disposed on the roughly lower side of the cam follower 2b, force that the cam follower 2b receives from the cam unit of the dial 1 can be counteracted by the urging force of the urging spring 3a, whereby it is possible to suppress the driving lever 2 from tilting. Accordingly, it is possible to reduce a fitting length of the supporting hole 2a with respect to the rotary shaft 21b. By providing the two urging springs 3a, 3b, since the urging force toward the driving lever 2 is twice as much in comparison to a configuration where a single urging spring is provided, spring force of each of the urging springs can be weakened. As a result, the urging springs 3a, 3b can be reduced in size, and a spring arrangement space in the rotary shaft direction and the radial direction can be reduced. The effect of the present disclosure can be obtained even in a case where a configuration of arranging only the urging spring 3a disposed on the roughly lower side of the cam follower 2b is adopted.

Hereinbelow, referring to FIGS. 13C, 14A, and 14B, the rotary member 25 and the click mechanism 10 are described.

The rotary member 25 is disposed on a lower side of the base 24, and rotates integrally with the dial 21, as described above. As illustrated in FIG. 13C, in an outer diameter of the rotary member 25, an undulating projection-and-depression portion where a valley portion 25c with a small radius and a mountain portion 25d with a large radius are alternately present at regular intervals is formed. As illustrated in FIG. 13C, the compression spring 6 is locked by the spring receiving portion 24e, and the click ball 7 is constantly urged toward the undulating projection-and-depression portion in a rotation center direction (direction of the rotary shaft 2b) by the compression spring 6. According to such a configuration, the dial 21 is stopped at a position where the click ball 7 is fitted into the valley portion 25c.

When the user performs a rotational operation of the operation unit 21a by one position, the click ball 7 climbs over the mountain portion 25d and is fitted into the adjacent the valley portion 25c. At this time, the operation force is generated in the dial 21, and the user can receive a click feeling of one click. By receiving the click feeling, the user can perform the rotational operation of the dial 21 accurately for the number of clicks as intended.

The click force by the compression spring 6 is set so as to be sufficiently strong in comparison to frictional force between the cam unit of the dial 21 and the cam follower 2b generated by the urging force of the urging spring(s) 3. Accordingly, an influence of the urging force of the urging spring(s) 3 to rotational operation force of the dial 21 can be ignored, whereby the rotational operation force can be roughly constant.

Figure 16:
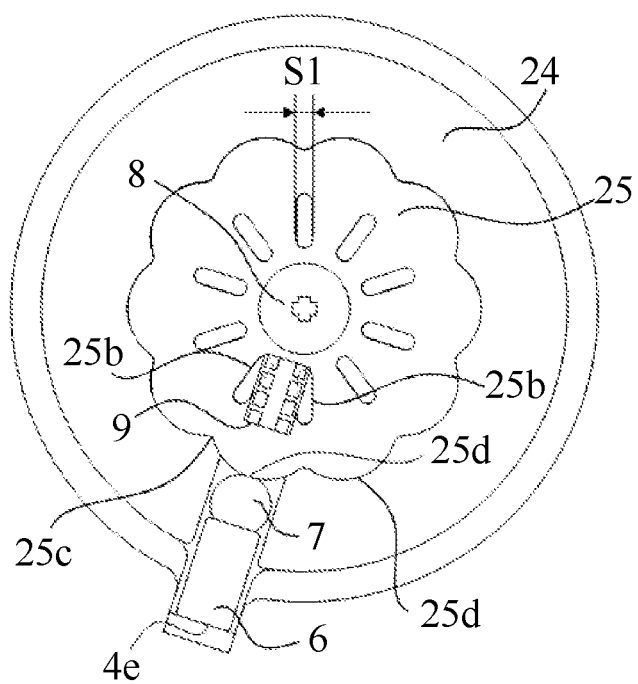
FIG. 16 is a lower surface view of the rotational operation unit while the dial is rotating according to the second embodiment.
Figure 17:
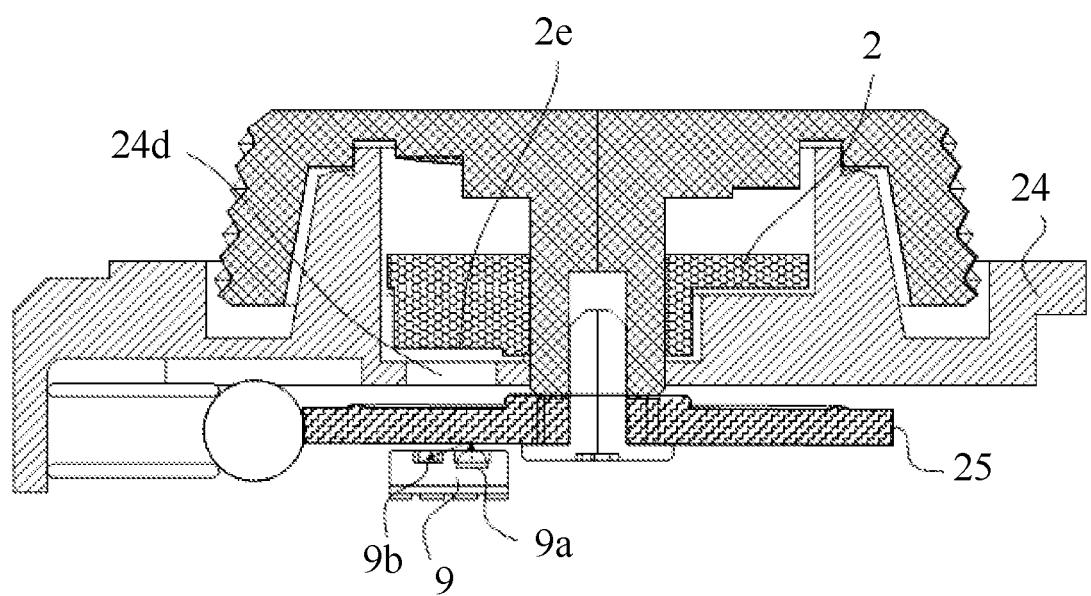
FIG. 17 is a sectional view along a B-B line of FIG. 13A in a state of FIG. 16 according to the second embodiment.

Hereinbelow, referring to FIGS. 13C, 14B, 16 and 17, a configuration of the distance sensor 9 is described. FIG. 16 is a lower surface view of the rotational operation unit 207 in a case where the dial 21 is rotating and the click ball 7 is urged to an apex of the valley portion 25c. FIG. 17 is a sectional view along a B-B line of FIG. 13A in a state of FIG. 16.

In FIGS. 13C and 14B, the dial 21 is stopped at a position where the click ball 7 is fitted into the valley portion 25c. The distance sensor 9 includes the light emitting unit 9a and the light-receiving unit 9b, and is disposed on a lower side of the rotary member 25. The rotary member 5 is provided with slit portions 25b at the same rotation positions as the valley portions 25c with the same number as that of the valley portions 25c. A portion of the rotary member 25 other than the slit portions 25b is configured by a member that does not transmit light from the light emitting unit 9a. The slit portions 25b, 24d and the reflective portion 2e are disposed right above the distance sensor 9. The slit portion 24d has a size enough not to hide the light emitting unit 9a and the light-receiving unit 9b. A width of each of the slit portions 25b is a width S1 that does not hide the light emitting unit 9a and the light-receiving unit 9b at a stopping position of the dial 21.

As illustrated in FIGS. 16 and 17, in accordance with the rotation of the dial 21, the slit portions 25b also rotate and move from above the light emitting unit 9a and the light-receiving unit 9b. As a result, the rotary member 25 is covered by the slit portion 24d and the reflective portion 2e located right above the distance sensor 9, and the light from the light emitting unit 9a is blocked.

Figure 18:
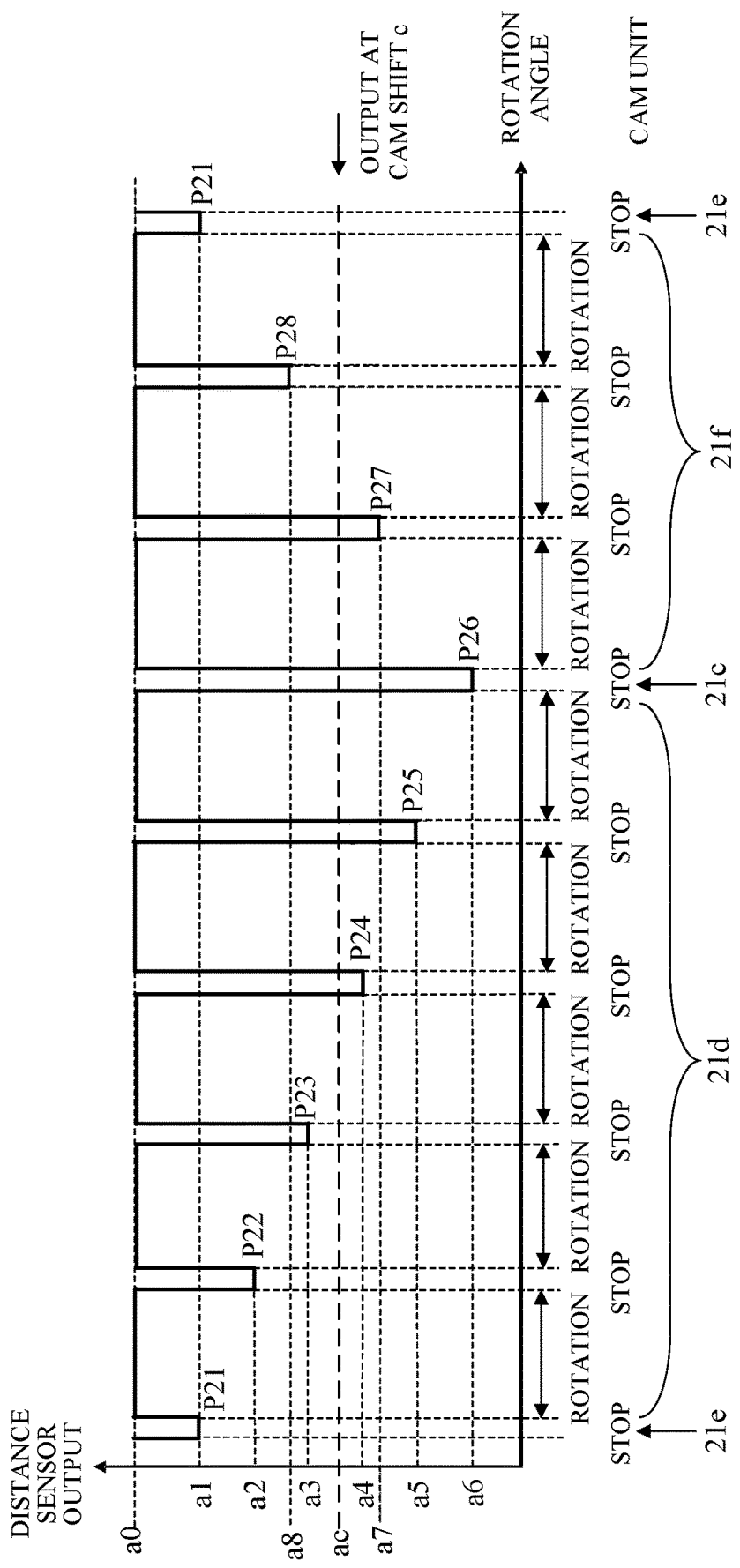
FIG. 18 is a diagram illustrating an output of a distance sensor with respect to a rotation angle of the dial according to the second embodiment.

Hereinbelow, referring to FIGS. 13C, 14A, 14B, 16, 17, and 18, a detection method of a position (rotation position) of the dial 21 in the rotation direction is described. FIG. 18 is a diagram illustrating an output of the distance sensor 9 with respect to a rotation angle of the dial 21, and illustrates the output of the distance sensor 9 in each mode. In this embodiment, by the user rotating the dial 21, the user can switch eight types in total of the image capturing modes with mode names of "P21", "P22", "P23", "P24", "P25", "P26", "P27", and "P28", in accordance with the rotation angle of the dial 21.

First, the output of the distance sensor 9 while the dial 21 is rotating is described. As illustrated in FIGS. 16 and 17, while the dial 21 is rotating, first, the light emitted from the light emitting unit 9a hits the rotary member 25, and the light reflected by the rotary member 25 reaches the light-receiving unit 9b. Next, the light-receiving unit 9b reads an intensity of the reflected light that has reached the light-receiving unit 9b. While the dial 21 is rotating, the light is blocked in the distance sensor 9 by the rotary member 25, and an output value of the distance sensor 9 is a0 that does not correspond to any of the image capturing modes.

Next, the output of the distance sensor 9 while the dial 21 is stopped is described. As one example, as illustrated in FIG. 14A, a state of the image capturing mode P21 where the cam follower 2b is in contact with the cam top 21e is described. As illustrated in FIGS. 13C and 14B, when the dial 21 stops, the slit portion 25b is located right above the distance sensor 9. At this time, the light emitted from the light emitting unit 9a passes through the slit portions 25b, 24d, and hits the reflective portion 2e. Then, the light reflected by the reflective portion 2e passes through the slit portions 24d, 25b, and reaches the light-receiving unit 9b. The light-receiving unit 9b reads an intensity of the reflected light that has reached the light-receiving unit 9b, and measures a distance between the distance sensor 9 and the reflective portion 2e. At this time, the output value of the distance sensor 9 is changed from the value a0 to a value a1 that corresponds to the image capturing mode P21.

Figure 19:
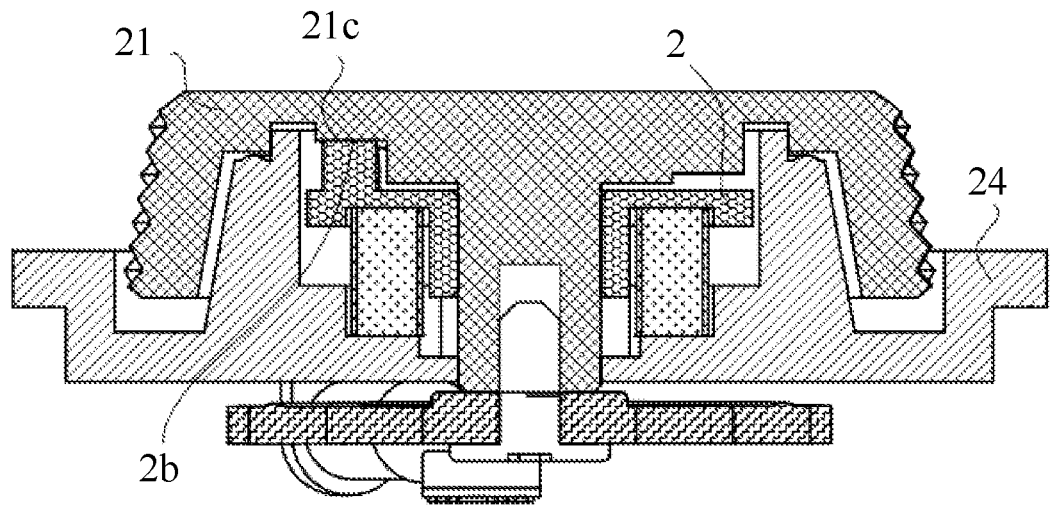
FIG. 19 is a sectional view along an A-A line of FIG. 13A in a case where a cam follower is in contact with a cam bottom according to the second embodiment.

Next, referring to FIGS. 11C, 14A, 18 and 19, a relationship between the cam unit of the dial 21 and the output of the distance sensor 9 is described. FIG. 19 is a sectional view along an A-A line of FIG. 13A in a state of the image capturing mode P26 where the cam follower 2b is in contact with the cam bottom 21c.

While the user is performing the rotational operation of the operation unit 21a clockwise from the state of the image capturing mode P21 illustrated in FIG. 14A, the light is blocked in the distance sensor 9 by the rotary member 25, and the output value of the distance sensor 9 is the value a0 that does not correspond to any of the image capturing modes. Also by the rotation of the cam unit, the cam follower 2b comes in contact with the first tilt surface 21d. As a result, the driving lever 2 moves to an upper direction of the rotary shaft 21b of the dial 21 in accordance with a cam surface of the first tilt surface 21d from the position of the state illustrated in FIG. 14A, and a distance between the distance sensor 9 and the reflective portion 2e changes.

When the dial 21 stops after a movement of one click, the light-receiving unit 9b reads the intensity of the reflected light that has reached the light-receiving unit 9b, and measures the distance between the distance sensor 9 and the reflective portion 2e. At this time, the output value of the distance sensor 9 is changed from the value a0 to a value a2 that corresponds to the image capturing mode P22.

When the dial 21 is further rotated clockwise, the output value of the distance sensor 9 is changed to the value a0. When the dial 21 stops for each click, the output value of the distance sensor 9 is changed from the value a0 to values a3, a4, and a5, whereby it is determined that the rotational operation unit 207 is at positions of the image capturing mode P23, the image capturing mode P24, and the image capturing mode P25.

When the dial 21 is further rotated clockwise, as illustrated in FIGS. 11C and 19, the cam follower 2b comes in contact with the cam bottom 21c. At this time, the output value of the distance sensor 9 is changed to a value a6, whereby it is determined that the rotational operation unit 207 is at a position of the image capturing mode P26.

When the dial 21 is further rotated clockwise, the output value of the distance sensor 9 is changed to the value a0, and the cam follower 2b comes in contact with the second tilt surface 21f. As a result, the driving lever 2 moves to a lower direction of the rotary shaft 21b of the dial 21 in accordance with the cam surface of the second tilt surface 21f from the state illustrated in FIG. 19, and the distance between the distance sensor 9 and the reflective portion 2e changes.

When the dial 21 stops after each click, the output value of the distance sensor 9 is changed to values a7, and a8, whereby it is determined that the rotational operation unit 207 is at positions of the image capturing mode P27, and the image capturing mode P28.

When the dial 21 is further rotated clockwise, and the dial 21 is rotated by one revolution, as illustrated in FIGS. 11C and 14A, the cam follower 2b comes in contact with the cam top 21e from the second tilt surface 21f. The output value of the distance sensor 9 is changed to the value a1, whereby it is determined to be the image capturing mode P21.

As described above, by rotating the dial 21 clockwise, all positions from the position of the image capturing mode P21 to the position of the image capturing mode P28 can be freely switched.

By rotating the dial 21 counterclockwise, all the positions from the position of the image capturing mode P28 to the position of the image capturing mode P21 can be freely switched.

In this manner, the output value of the distance sensor 9 is the value a0 being constant during the rotation, and the output value is changed from the value a0 in accordance with the distance between the distance sensor 9 and the reflective portion 2e only at the stopping positions, whereby the stopping position of the dial 21 can be determined.

For example, as illustrated in FIG. 11C, in a case of a reciprocating cam, a position where the shift of the cam is "c" is present each in the first tilt surface 21d and in the second tilt surface 21f, that is, such positions are present in two places. Accordingly, it is possible that the output values of the distance sensor 9 are to be the same, and an image capturing mode is set to the same one twice while the dial 21 rotates by one revolution. However, in this embodiment, the tilt angle of the first tilt surface 21d is different from the tilt angle of the second tilt surface 21f, and a timing of the detection by the slit portion 25b is limited. For example, the output value of the distance sensor 9 in a case where the shift of the cam is to be "c" is supposed to be "ac" as illustrated in FIG. 18, however, in the case where the shift of the cam is "c", since it being a position while the dial 21 is rotating, the output value of the distance sensor 9 is actually not "ac" but a0.

In this manner, even in a case of the reciprocating cam where the shifts of the cam coming and going overlap with each other, the distance between the distance sensor 9 and the reflective portion 2e is not measured at the stopping position of the dial 21. Accordingly, an image capturing mode can be suppressed from being set to the same one twice while the dial 21 rotates by one revolution.

Accordingly, the reciprocating cam can reduce a height in a thrust direction of the cam in comparison to a cam not being a reciprocating cam, which is effective in reducing in size the rotational operation unit 207.

Figure 20:
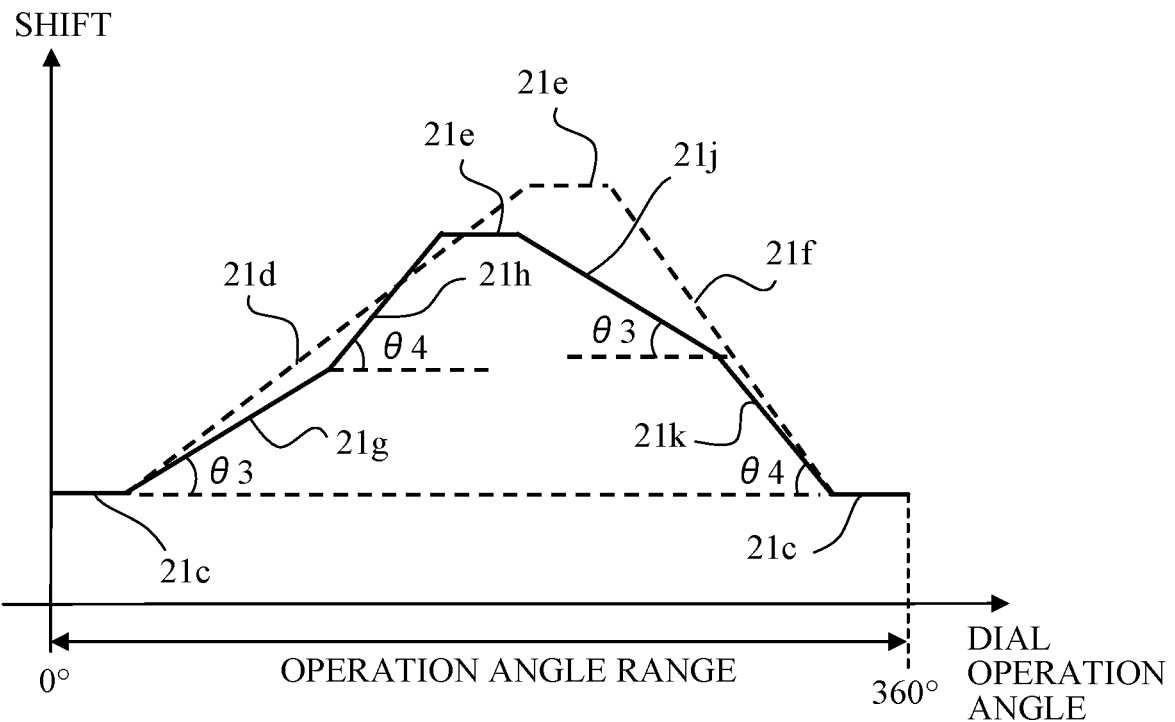
FIG. 20 is a diagram illustrating another example of an expanded view of a cam unit in a case where the dial is viewed from a lower surface according to the second embodiment.

FIG. 20 is a diagram illustrating another example of an expanded view of the cam unit in a case where the dial 21 is viewed from a lower surface. In FIG. 20, a horizontal axis illustrates an operation angle of the dial 21, and a vertical axis illustrates a shift in the rotary shaft direction.

In this embodiment, as illustrated in FIGS. 11B and 11C, the dial 21 includes the first tilt surface 21d that continuously connects the cam bottom 21c with the cam top 21e, and the second tilt surface 21f that continuously connects the cam top 21e with the cam bottom 21c. However, as illustrated in solid lines of FIG. 20, a third tilt surface 21g and a fourth tilt surface 21h each having different tilt angles may be provided from the cam bottom 21c to the cam top 21e. A fifth tilt surface 21j and a sixth tilt surface 21k each having different tilt angles may also be provided from the cam top 21e to the cam bottom 21c. As described above, by including the cam unit having the plurality of different tilt angles when coming and going, in comparison to FIG. 11C, the number of image capturing modes is increased, and even in a case where the stopping positions of the dial 21 are increased, it is possible to set the shifts of the cam without overlapping each other when coming and going of the reciprocating cam. As illustrated in the solid lines of FIG. 20, the tilt angle between the third tilt surface 21g and the fifth tilt surface 21j is θ3, and the tilt angle between the fourth tilt surface 21h and the sixth tilt surface 21k is θ4. Accordingly, in a case of rotating the dial 21 by one revolution, the number of stopping positions of the dial 21 in a range between the third tilt surface 21g and the fourth tilt surface 21h and in a range between the fifth tilt surface 21j and the sixth tilt surface 21k are the same. As a result, as illustrated in dotted lines of FIG. 20, in comparison to a cam with the number of stopping positions in a range of the first tilt surface 21d being different from that in a range of the second tilt surface 21f illustrated in FIG. 11C, a height in a thrust direction of the cam can be reduced, which is effective in reducing in size the rotational operation unit 207.

Third Embodiment

In this embodiment, a configuration of the rotational operation unit is different from that of the second embodiment. Corresponding members will be designated by the same reference numerals as the second embodiment, and a duplicate description thereof will be omitted.

Figure 21:
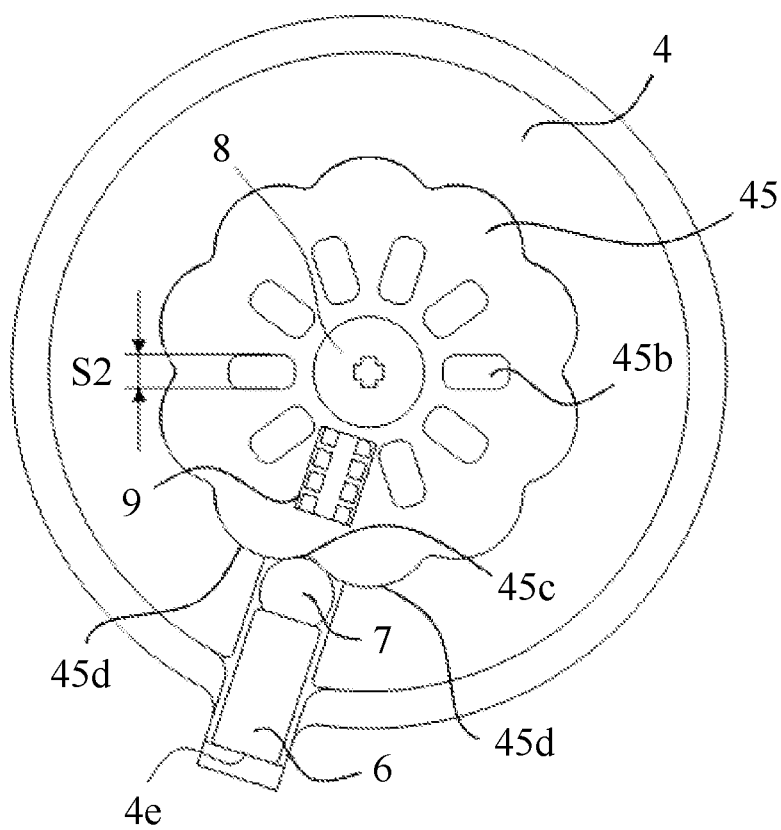
FIG. 21 is a lower surface view of the rotational operation unit in a case where the dial is stopped at a position where a click ball is fitted into a valley portion according to a third embodiment.
Figure 22:
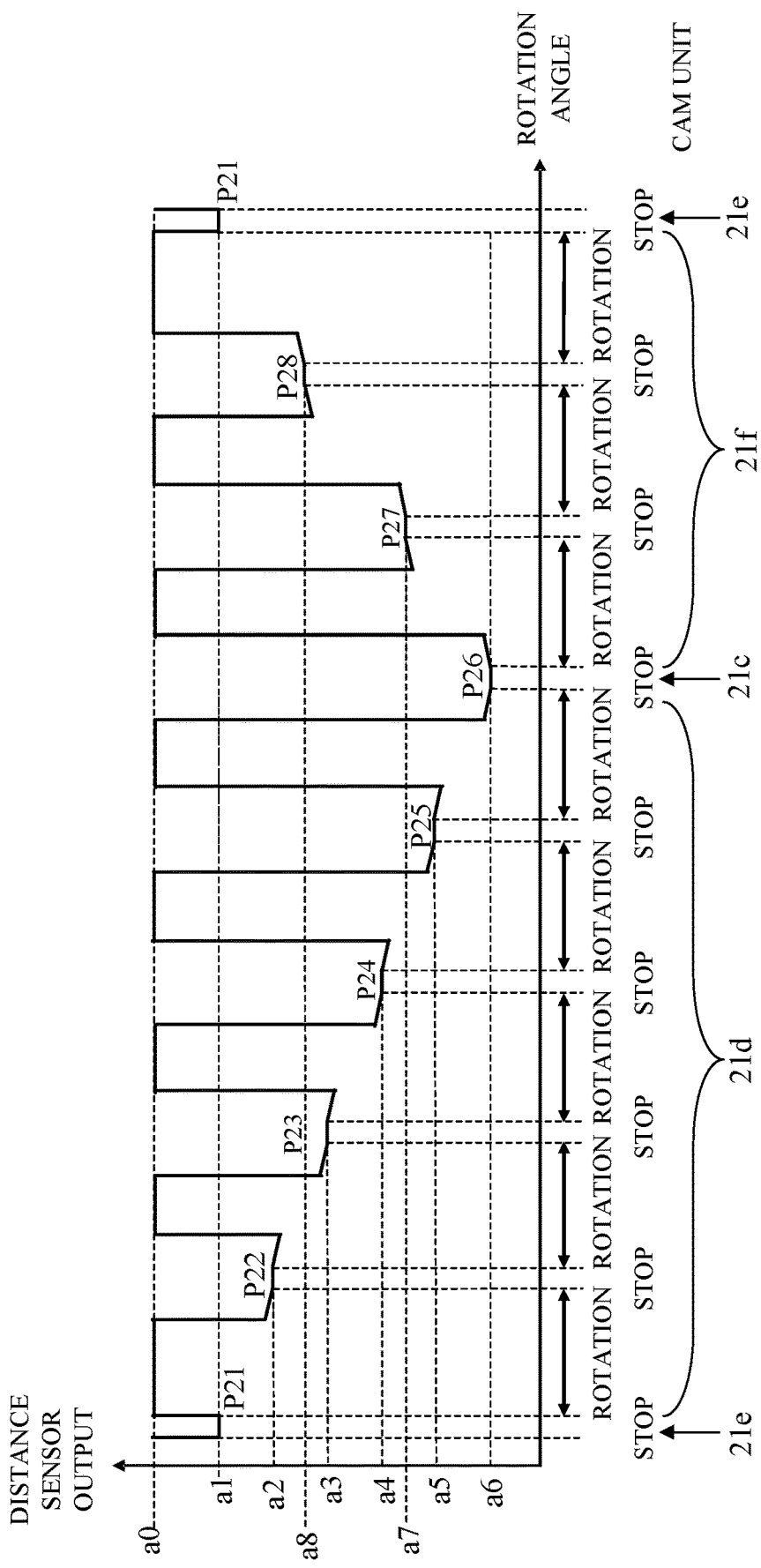
FIG. 22 is a diagram illustrating the output of the distance sensor with respect to the rotation angle of the dial according to the third embodiment.

FIG. 21 is a lower surface view of the rotational operation unit 207 in a case where the dial 21 is stopped at a position where the click ball 7 is fitted into a valley portion 45c of a rotary member 45 according to this embodiment. FIG. 22 is a diagram illustrating the output of the distance sensor 9 with respect to the rotation angle of the dial 21 according to this embodiment.

The rotary member 45 is provided with slit portions 45b at the same rotation positions as the valley portions 45c with the same number as that of the valley portions 45c. A portion of the rotary member 45 other than the slit portions 45b is configured by a member that does not transmit light from the light emitting unit 9a. As illustrated in FIG. 21, a width of each of the slit portions 45b is a width S2 that does not hide the light emitting unit 9a and the light-receiving unit 9b when the dial 21 stops. The width S2 is larger than the width S1 of each of the slit portions 25b in the second embodiment. Accordingly, as illustrated in FIG. 22, the output value of the distance sensor 9 changes from the value a0 before the dial 21 stops. At this time, since the position of the reflective portion 2e has been changed by the rotation of the dial 21, the output value of the distance sensor 9 right before the stopping position is an output value having a tilt. As a result, it is possible to determine the rotation direction of the dial 21 by a positive or negative sign of the tilt of the output value of the distance sensor 9.

In the configuration of the second embodiment, it is not possible to determine at which stopping position the dial 21 is located until the dial 21 stops. However, in this embodiment, since the rotation direction of the dial 21 can be detected, it is possible to provide the user with a guidance of a direction of the image capturing mode to be moved on next by using the display unit 105. Especially, in a case of the dial 21 with a large rotation angle, since one click revolution takes a longer time, by providing the guidance of the image capturing mode to be moved on next, it is effective in improving a responsiveness for changing the image capturing modes.

While the disclosure has described example embodiments, it is to be understood that some embodiments are not limited to the disclosed embodiments. The scope of the following claims is to be accorded the broadest interpretation so as to encompass all such modifications and equivalent structures and functions.

The present disclosure can provide a rotational operation device with high durability and that can reduce an erroneous detection of a rotation position of a rotational operation member, as well as being reduced in size.

This application claims priority to Japanese Patent Application No. 2023-016372, which was filed on Feb. 6, 2023, and Japanese Patent Application No. 2023-081644, which was filed on May 17, 2023, and which are hereby incorporated by reference herein in its entirety.

What is claimed is:

1. A rotational operation device comprising:
   a rotational operation member including a rotary shaft and a cam unit formed around the rotary shaft, the cam unit having a contact surface that varies in position along a rotary shaft direction parallel to the rotary shaft, the rotational operation member being rotatable around the rotary shaft;
   a drive member including a cam follower in contact with the contact surface, the drive member being movable in the rotary shaft direction as a position of the cam follower along the rotary shaft direction changes in accordance with a rotation of the rotational operation member; and
   a detector configured to measure a distance to the drive member and detect a rotation position of the rotational operation member based on the distance.

2. The rotational operation device according to claim 1, further comprising an urging member that urges the drive member so that the cam follower comes in contact with the cam unit.

3. The rotational operation device according to claim 2, wherein the urging member is disposed so that at least a portion of the urging member overlaps the cam follower when viewed from the rotary shaft direction.

4. The rotational operation device according to claim 2, further comprising a click mechanism configured to generate click force in accordance with the rotation of the rotational operation member,
   wherein urging force of the urging member is weaker than the click force generated by the click mechanism.

5. The rotational operation device according to claim 1, wherein the cam unit includes a first surface provided at a first position in the rotary shaft direction, a second surface provided at a second position different from the first position in the rotary shaft direction, and a connection surface that continuously connects the first surface with the second surface.

6. The rotational operation device according to claim 5, wherein the cam unit has a shape returning to an original position when the rotational operation member rotates by one revolution.

7. The rotational operation device according to claim 5, wherein the cam unit includes a first connection surface and a second connection surface that continuously connects the first surface with the second surface.

8. The rotational operation device according to claim 7, wherein a tilt angle of the first connection surface is different from that of the second connection surface.

9. The rotational operation device according to claim 5, wherein the cam unit includes, in order along a rotation direction of the rotational operation member, the first surface, a third connection surface, a fourth connection surface, the second surface, a fifth connection surface, and a sixth connection surface
   a tilt angle of the third connection surface is different from that of the fourth connection surface, and
   a tilt angle of the fifth connection surface is different from that of the sixth connection surface.

10. The rotational operation device according to claim 9, wherein the tilt angle of the third connection surface is the same as that of the fifth connection surface, and
    the tilt angle of the fourth connection surface is the same as that of the sixth connection surface.

11. The rotational operation device according to claim 1, further comprising a holding member configured to rotatably hold the rotational operation member.

12. The rotational operation device according to claim 1, wherein the cam follower comes in contact with the cam unit in the rotary shaft direction.

13. The rotational operation device according to claim 1, further comprising a plurality of slit portions along a rotation direction of the rotational operation member, and a rotary member rotatable in accordance with the rotation of the rotational operation member,
    wherein the rotary member is disposed between the detector and the drive member in the rotary shaft direction, and
    wherein the detector detects the rotation position in a case where at least a portion of the slit portions overlaps the detector when viewed from the rotary shaft direction.

14. The rotational operation device according to claim 13, wherein the detector includes:
    a light emitting unit;

a light-receiving unit that receives light emitted from the light emitting unit followed by being reflected by the drive member, and wherein the slit portions are configured to transmit the light emitted from the light emitting unit and the light reflected by the drive member, in a case where at least the portion of the slit portions overlaps the detector when viewed from the rotary shaft direction.

15. An electronic apparatus comprising:

a rotational operation device; and a receiving unit configured to receive a signal regarding a rotation position, wherein the rotational operation device includes:

a rotational operation member including a rotary shaft and a cam unit formed around the rotary shaft, the cam unit having a contact surface that varies in position along a rotary shaft direction parallel to the rotary shaft, the rotational operation member being rotatable around the rotary shaft;

a drive member including a cam follower in contact with the contact surface, the drive member being movable in the rotary shaft direction as a position of the cam follower along the rotary shaft direction changes in accordance with a rotation of the rotational operation member; and a detector configured to measure a distance to the drive member and detect a rotation position of the rotational operation member based on the distance.

16. The rotational operation device according to claim 1, wherein a movement of the drive member around the rotary shaft is regulated.

17. The rotational operation device according to claim 1, wherein the rotational operation member and the drive member are arranged such that the cam unit and the cam follower face each other.

* * * * *